US008269892B2

(12) United States Patent
Asada et al.

(10) Patent No.: US 8,269,892 B2
(45) Date of Patent: Sep. 18, 2012

(54) RECEIVING DEVICE, AND INPUT SWITCHING CONTROL METHOD IN RECEIVING DEVICE

(75) Inventors: Keijiro Asada, Tokyo (JP); Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 905 days.

(21) Appl. No.: 12/313,995

(22) Filed: Nov. 26, 2008

(65) Prior Publication Data
US 2009/0190033 A1  Jul. 30, 2009

(30) Foreign Application Priority Data

Dec. 6, 2007  (JP) ................. P2007-315491

(51) Int. Cl.
*H04N 3/27* (2006.01)
*G06F 3/00* (2006.01)

(52) U.S. Cl. .......... 348/554; 348/571; 348/705; 710/15; 710/16; 710/17; 710/18; 710/19; 710/107; 710/300; 726/2; 726/3; 726/4

(58) Field of Classification Search .......... None
See application file for complete search history.

(56) References Cited

U.S. PATENT DOCUMENTS

| | | | | |
|---|---|---|---|---|
| 5,285,283 A * | 2/1994 | Fairhurst et al. | ............. | 348/705 |
| 5,386,240 A * | 1/1995 | Hori | ............. | 348/473 |
| 5,808,693 A * | 9/1998 | Yamashita et al. | ............. | 348/554 |
| 6,078,362 A * | 6/2000 | De Boer | ............. | 348/585 |
| 7,139,032 B2 * | 11/2006 | Unemura | ............. | 348/555 |
| 7,756,118 B2 * | 7/2010 | Harmon et al. | ............. | 370/352 |
| 2002/0157094 A1 * | 10/2002 | Saito et al. | ............. | 725/38 |
| 2003/0214604 A1 * | 11/2003 | Lee | ............. | 348/552 |
| 2004/0046893 A1 * | 3/2004 | Choi | ............. | 348/554 |
| 2004/0095509 A1 | 5/2004 | Okamoto et al. | ............. | 348/462 |
| 2005/0010944 A1 * | 1/2005 | Wright et al. | ............. | 725/22 |
| 2005/0154917 A1 * | 7/2005 | deCarmo | ............. | 713/201 |

(Continued)

FOREIGN PATENT DOCUMENTS

JP 2001-346101 A 12/2001

(Continued)

OTHER PUBLICATIONS

'High-Definition Multimedia Interface Specification Version 1.3a' by Hitachi et al., Nov. 10, 2006, sections 3, 4.1-4.2.1, and 8.3-8.3.4, full copy can be obtained at http://www.hdmi.org.*
'High-bandwidth Digital Content Protection System' Revision 1.3, by Digital Content Protection LLC, Dec. 21, 2006, pp. 1-20 of 90, full copy can be found at http://www.digital-cp.com.*

*Primary Examiner* — Henry Tsai
*Assistant Examiner* — Steven Snyder
(74) *Attorney, Agent, or Firm* — Lerner, David, Littenberg, Krumholz & Mentlik, LLP

(57) ABSTRACT

A receiving device includes a plurality of digital input terminals, a signal receiving unit for receiving a video signal, and a switch unit for selectively connecting the plurality of digital input terminals to the signal receiving unit. The signal receiving unit is a receiving device that performs a mutual authentication with an external apparatus connected via a transmission channel to a digital input terminal selected by the switch unit, and receives a video signal from the external apparatus. The signal receiving unit includes a priority determining unit for cyclically determining a priority of the plurality of digital input terminals and a controller for controlling the switch unit so that a digital input terminal, which is determined by the priority determining unit as having a highest priority, is connected to the signal receiving unit.

13 Claims, 20 Drawing Sheets

U.S. PATENT DOCUMENTS

| | | | |
|---|---|---|---|
| 2007/0153131 A1* | 7/2007 | Yang et al. | 348/705 |
| 2007/0153132 A1* | 7/2007 | Jong | 348/705 |
| 2007/0195077 A1* | 8/2007 | Hwang et al. | 345/204 |
| 2007/0252746 A1* | 11/2007 | Hoffert et al. | 341/158 |
| 2007/0298656 A1* | 12/2007 | He | 439/607 |
| 2008/0024676 A1* | 1/2008 | Lin | 348/705 |
| 2008/0216145 A1* | 9/2008 | Barton et al. | 725/131 |
| 2009/0144805 A1* | 6/2009 | Araki | 726/2 |
| 2010/0118193 A1* | 5/2010 | Boyden et al. | 348/554 |
| 2011/0176057 A1* | 7/2011 | Okamura et al. | 348/554 |
| 2011/0317634 A1* | 12/2011 | Wong | 370/329 |
| 2011/0320963 A1* | 12/2011 | Wong | 715/755 |

FOREIGN PATENT DOCUMENTS

| | | |
|---|---|---|
| JP | 2005-102002 A | 4/2005 |
| JP | 2006-246300 A | 9/2006 |
| JP | 2007-124090 A | 5/2007 |
| JP | 2007-288247 A | 11/2007 |
| JP | 2007-306117 A | 11/2007 |
| WO | WO-02/078336 A1 | 10/2002 |

* cited by examiner

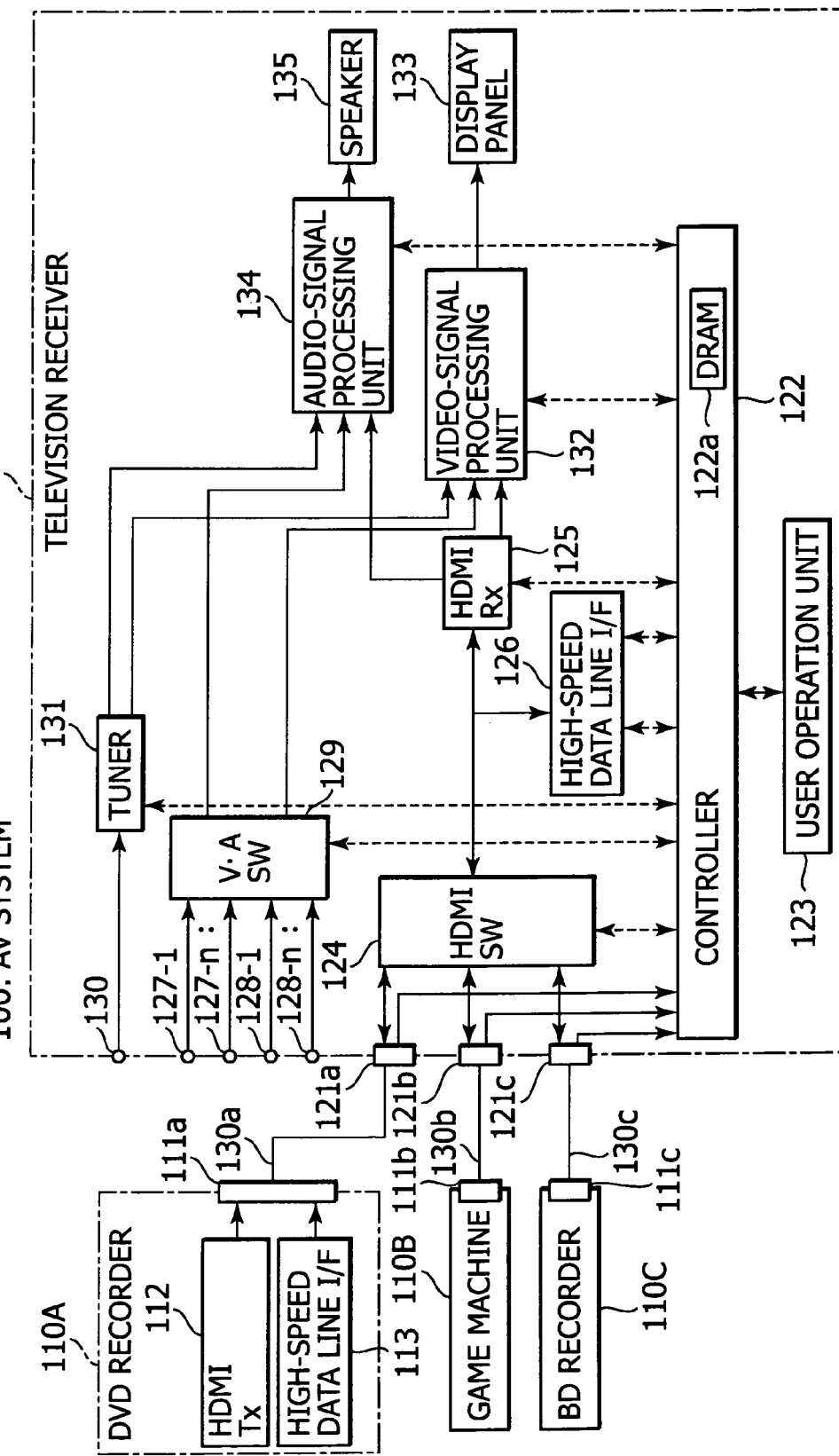

FIG. 2

| | | | | | | | | |
|---|---|---|---|---|---|---|---|---|
| INFOFRAME TYPE CODE | INFOFRAME TYPE=$02_{16}$ | | | | | | | |
| INFOFRAME VERSION NUMBER | VERSION=$02_{16}$ | | | | | | | |
| LENGTH OF AVI INFOFRAME | LENGTH OF AVI INFOFRAME (13) | | | | | | | |
| DATA BYTE 1 | RSVD(0) | Y1 | Y0 | A0 | B1 | B0 | S1 | S0 |
| DATA BYTE 2 | C1 | C0 | M1 | M0 | R3 | R2 | R1 | R0 |
| DATA BYTE 3 | CA | EC2 | EC1 | EC0 | Q1 | Q0 | SC1 | SC0 |
| DATA BYTE 4 | RSVD(0) | VIC6 | VIC5 | VIC4 | VIC3 | VIC2 | VIC1 | VIC0 |
| DATA BYTE 5 | Q3 | Q2 | CT1 | CT0 | PR3 | PR2 | PR1 | PR0 |
| DATA BYTE 6,7 | LINE NUMBER OF END OF TOP BAR | | | | | | | |
| DATA BYTE 8,9 | LINE NUMBER OF START OF BOTTOM BAR | | | | | | | |
| DATA BYTE 10,11 | PIXEL NUMBER OF END OF LEFT BAR | | | | | | | |
| DATA BYTE 12,13 | PIXEL NUMBER OF START OF RIGHT BAR | | | | | | | |
| DATA BYTE 14···27 | RESERVED (0) | | | | | | | |

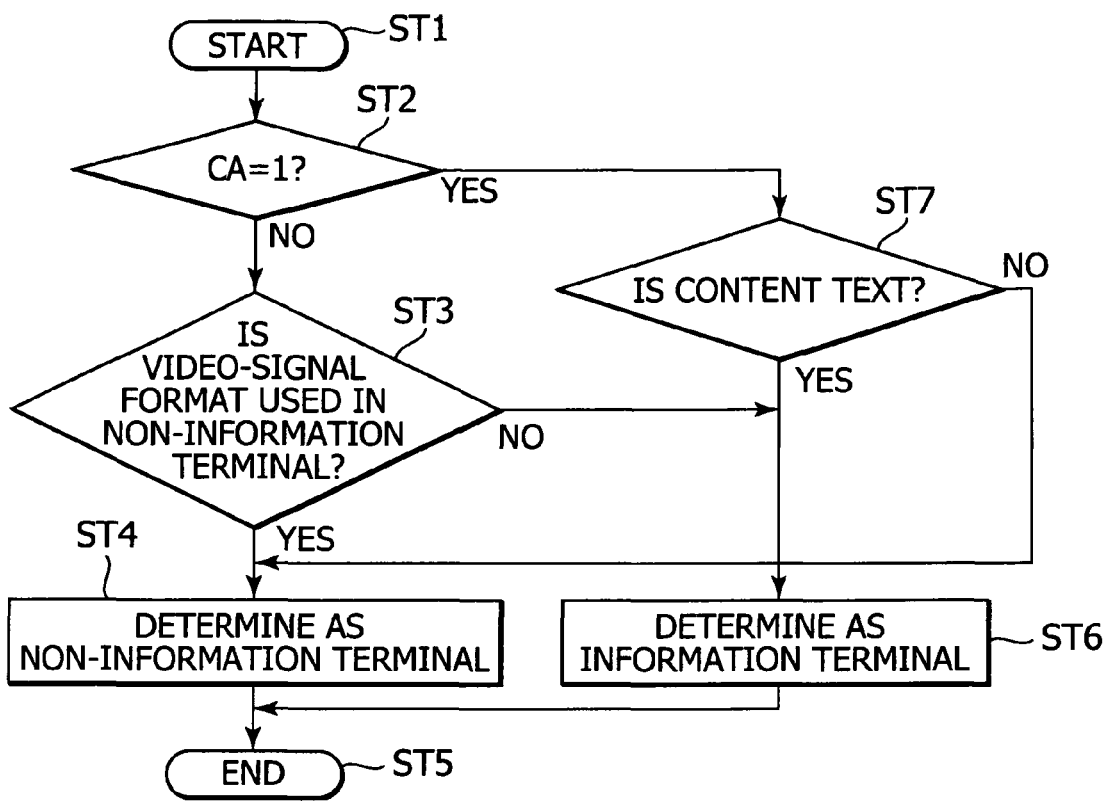

| EFFECTIVE HORIZONTAL RESOLUTION | EFFECTIVE VERTICAL RESOLUTION | VERTICAL FREQUENCY | |
|---|---|---|---|
| 720 PIXEL | 480 LINE | 60 Hz | INTERLACED |
| 720 PIXEL | 480 LINE | 60 Hz | PROGRESSIVE |
| 1920 PIXEL | 1080 LINE | 60 Hz | INTERLACED |
| 1280 PIXEL | 720 LINE | 60 Hz | PROGRESSIVE |
| 1920 PIXEL | 1080 LINE | 60 Hz | PROGRESSIVE |
| 720 PIXEL | 576 LINE | 50 Hz | INTERLACED |
| 720 PIXEL | 576 LINE | 50 Hz | PROGRESSIVE |
| 1920 PIXEL | 1080 LINE | 50 Hz | INTERLACED |
| 1280 PIXEL | 720 LINE | 50 Hz | PROGRESSIVE |
| 1920 PIXEL | 1080 LINE | 50 Hz | PROGRESSIVE |
| 1920 PIXEL | 1080 LINE | 24 Hz | PROGRESSIVE |

FIG. 5

| INFOFRAME TYPE CODE | INFOFRAME TYPE=03₁₆ | | |
|---|---|---|---|
| INFOFRAME VERSION NUMBER | VERSION=01₁₆ | | |
| LENGTH OF SOURCE PRODUCT DESCRIPTION INFOFRAME | LENGTH OF SOURCE PRODUCT DESCRIPTION INFOFRAME =25 | | |
| DATA BYTE 1 | 0 | VENDOR NAME CHARACTER 1 VN1 (7BIT ASCII CODE) | |
| DATA BYTE 2 | 0 | VENDOR NAME CHARACTER 2 VN2 | |
| DATA BYTE 3 | 0 | VENDOR NAME CHARACTER 3 VN3 | |
| DATA BYTE 4 | 0 | VENDOR NAME CHARACTER 4 VN4 | |
| DATA BYTE 5 | 0 | VENDOR NAME CHARACTER 5 VN5 | |
| DATA BYTE 6 | 0 | VENDOR NAME CHARACTER 6 VN6 | |
| DATA BYTE 7 | 0 | VENDOR NAME CHARACTER 7 VN7 | |
| DATA BYTE 8 | 0 | VENDOR NAME CHARACTER 8 VN8 | |
| DATA BYTE 9 | 0 | PRODUCT DESCRIPTION CHARACTER 1 PD1 (7BIT ASCII CODE) | |
| DATA BYTE 10 | 0 | PRODUCT DESCRIPTION CHARACTER 2 PD2 | |
| DATA BYTE 11 | 0 | PRODUCT DESCRIPTION CHARACTER 3 PD3 | |
| DATA BYTE 12 | 0 | PRODUCT DESCRIPTION CHARACTER 4 PD4 | |
| DATA BYTE 13 | 0 | PRODUCT DESCRIPTION CHARACTER 5 PD5 | |
| DATA BYTE 14 | 0 | PRODUCT DESCRIPTION CHARACTER 6 PD6 | |
| DATA BYTE 15 | 0 | PRODUCT DESCRIPTION CHARACTER 7 PD7 | |
| DATA BYTE 16 | 0 | PRODUCT DESCRIPTION CHARACTER 8 PD8 | |
| DATA BYTE 17 | 0 | PRODUCT DESCRIPTION CHARACTER 9 PD9 | |
| DATA BYTE 18 | 0 | PRODUCT DESCRIPTION CHARACTER 10 PD10 | |
| DATA BYTE 19 | 0 | PRODUCT DESCRIPTION CHARACTER 11 PD11 | |
| DATA BYTE 20 | 0 | PRODUCT DESCRIPTION CHARACTER 12 PD12 | |
| DATA BYTE 21 | 0 | PRODUCT DESCRIPTION CHARACTER 13 PD13 | |
| DATA BYTE 22 | 0 | PRODUCT DESCRIPTION CHARACTER 14 PD14 | |
| DATA BYTE 23 | 0 | PRODUCT DESCRIPTION CHARACTER 15 PD15 | |
| DATA BYTE 24 | 0 | PRODUCT DESCRIPTION CHARACTER 16 PD16 | |
| DATA BYTE 25 | SOURCE DEVICE INFORMATION | | |

| Code | Source Device InformationCode |
|---|---|
| 00h | unknown |
| 01h | Digital STB |
| 02h | DVD player |
| 03h | D-VHS |
| 04h | HDD Videorecorder |
| 05h | DVC |
| 06h | DSC |
| 07h | Video CD |
| 08h | Game |
| 09h | PC general |
| 0Ah | Blu-Ray Disc(BD) |
| 0Bh | Super Audio CD |
| 0Ch : FFh | Reserved |

FIG. 10

HDMI PIN ARRAY (IN CASE OF TYPE-A)

| PIN | SIGNAL ASSIGNMENT | PIN | SIGNAL ASSIGNMENT |
|---|---|---|---|
| 1 | TMDS DATA2+ | 2 | TMDS DATA2 SHIELD |
| 3 | TMDS DATA2− | 4 | TMDS DATA1+ |
| 5 | TMDS DATA1 SHIELD | 6 | TMDS DATA1− |
| 7 | TMDS DATA0+ | 8 | TMDS DATA0 SHIELD |
| 9 | TMDS DATA0− | 10 | TMDS CLOCK+ |
| 11 | TMDS CLOCK SHIELD | 12 | TMDS CLOCK− |
| 13 | CEC | 14 | RESERVED (N.C. ON DEVICE) |
| 15 | SCL | 16 | SDA |
| 17 | DDC/CEC GROUND | 18 | +5V POWER |
| 19 | HOT PLUG DETECT | | |

RECEIVING DEVICE, AND INPUT SWITCHING CONTROL METHOD IN RECEIVING DEVICE

CROSS-REFERENCE TO RELATED APPLICATIONS

The present application claims priority from Japanese Patent Application No. JP 2007-315491, filed in the Japanese Patent Office on Dec. 6, 2007, the entire content of which is incorporated herein by reference.

BACKGROUND OF THE INVENTION

Field of the Invention

The present invention relates to a receiving device, such as a television receiver, having a plurality of HDMI (High Definition Multimedia Interface) terminals, for example, and an input switching control method therefore. More particularly, the present invention relates to a receiving device, etc., which cyclically determines a priority of plurality of digital input terminals based on connection information of an external apparatus, selection information of an image-display video signal, etc., and connects a signal receiving unit to a digital input terminal having the highest priority, thereby effectively performing an authentication with the external apparatus to expedite a video-output time.

In recent years, an HDMI (High Definition Multimedia Interface) has gradually become widely used as a communication interface for transmitting at high speed a digital video signal, i.e., a non-compressed (baseband) video signal (hereinafter, referred to as "image data") and a digital audio signal (hereinafter, referred to as "audio data") accompanying the video signal from a DVD (Digital Versatile Disc) recorder, a set top box, and other AV (Audio Visual) sources, for example, to a television receiver, a projector, and other displays. For example, in Patent Application Publication No. WO2002/078336, Patent Document 1, there is a detailed description of an HDMI standard.

SUMMARY OF THE INVENTION

Recently, the HDMI is a high-priority feature in a television receiver, and the number of HDMI terminals provided in the television receiver has a great significance. Normally, the number of the terminals is two or more.

The television receiver provided with the HDMI terminal needs to be provide therein with an HDMI receiver (HDMI receiving unit) as a signal receiving unit. The provision of the HDMI receivers of which the number is same as that of the HDMI terminals is very difficult in view of cost competitiveness because a chip cost of the HDMI receiver is very high, and there is also an issue that a load of a control software increases.

Thus, there has been proposed a technique in which the HDMI switcher is used to appropriately switch and use one HDMI receiver with respect to a plurality of HDMI terminals. In this case, however, after the HDMI terminal connected to the HDMI receiver is switched, a process for authenticating mutually between the HDMI receiver and a source apparatus connected to the HDMI terminal is started. The HDMI receiver becomes in a state of receiving a video signal from the source apparatus after the authentication process, and thus, there was an issue that a video-output time is delayed.

In an embodiment of the present invention, it is desired to effectively perform an authentication with an external apparatus to expedite a video-output time.

A concept of the present invention includes a plurality of digital input terminals, a signal receiving unit for receiving a video signal, and a switch unit for selectively connecting the plurality of digital input terminals to the signal receiving unit.

The signal receiving unit is a receiving device that performs a mutual authentication with an external apparatus connected via a transmittance channel to a digital input terminal selected by the switch unit, and thereafter, receives a video signal from the external apparatus. The receiving device includes a priority determining unit for cyclically determining a priority of the plurality of digital input terminals, at least based on connection information of the external apparatus in the plurality of digital input terminals and selection information of a video signal for a user image display, and a controller for controlling the switch unit so that a digital input terminal, which is determined by the priority determining unit as having the highest priority, is connected to the signal receiving unit.

In an embodiment of the present invention, the plurality of digital input terminals are connected via the switch unit to the signal receiving unit. Between the digital input terminal selected by the switch unit and the signal receiving unit, a mutual authentication is performed, and thereafter, the video signal is transmitted from the external apparatus to the signal receiving unit. In this case, from the external apparatus to the signal receiving unit, the video signal, for example, is transmitted by a differential signal through a plurality of channels. Communication between the signal receiving unit and the external apparatus is performed by a communicating unit of a bi-directional communication using predetermined lines configuring a transmitting channel, for example. When the transmitting channel is an HDMI cable, a reserved line and an HPD line configuring the HDMI cable, for example, are used as the predetermined lines.

At least based on connection information of an external apparatus in a plurality of digital input terminals and selection information of a user image-display video signal, a priority of the plurality of digital input terminals is cyclically determined, and the switch unit is so controlled that the signal receiving unit is connected to a digital input terminal having the highest priority.

Accordingly, the authentication with the external apparatus comes to be performed effectively, and as a result, a video-output time is expedited. For example, in a state that an image display by a video signal from the external apparatus connected to a certain digital input terminal is performed, and when a power supply of the external apparatus is turned off, the signal receiving unit is immediately connected to the other digital input terminal, and with the external apparatus connected to the other digital input terminal, an authentication process is started. As a result, when the user selects, as an image-display video signal, the video signal from the external apparatus connected to the other digital input terminal, the video-output time is expedited.

In an embodiment of the present invention, for example, the priority determining unit may cyclically determine the priority of the plurality of digital input terminals, based on connection-terminal information of an external apparatus mutually authenticated with the signal receiving unit, together with the connection information of the external apparatus in the plurality of digital input terminals and the selection information of the video signal for a user image display.

In this case, for example, in a state that an image display by the video signal from the external apparatus connected to a certain digital input terminal is performed, and when the user selects, as the image-display video signal, a video signal from an analog input terminal or an internal tuner, the signal receiving unit still holds an authentication state with the external apparatus connected to the certain digital input terminal, and thus, when thereafter the user selects, as the image-display video signal, the video signal from the external apparatus connected to the certain digital input terminal, the video-output time is expedited.

In an embodiment of the present invention, for example, the priority determining unit may cyclically determine the priority of the plurality of digital input terminals, based on connection-terminal information of an external apparatus whose power supply is turned on at last, together with the connection information of the external apparatus in the plurality of digital input terminals and the selection information of the video signal for a user image display.

In this case, for example, in a state that an image by a video signal from the analog input terminal or the internal tuner is displayed and when a power supply of a certain external apparatus is turned on, the signal receiving unit is connected to the digital input terminal connected with the certain external apparatus, and starts the authentication process with the certain external apparatus. As a result, when the user selects, as an image-display video signal, the video signal from the certain external apparatus, the video-output time is expedited.

Further, in an embodiment of the present invention, the priority determining unit may be arranged to cyclically determine the priority of the plurality of digital input terminals, based on types of the external apparatus connected to the plurality of digital input terminals, together with the connection information of the external apparatus in the plurality of digital input terminals and the selection information of the video signal for a user image display.

In this case, for example, in a state that an image by a video signal from the analog input terminal or the internal tuner is displayed, the signal receiving unit is connected to the digital input terminal connected to an information terminal such as a personal computer, for example, and starts an authentication process with the information terminal. As a result, when the user selects, as an image-display video signal, the video signal from the information terminal, the video-output time is expedited.

For example, in the priority determining unit, types of the external apparatus are determined, based on a format of the video signal transmitted from the external apparatus. For example, when the video signal format is not a format specified by EIA/CEA standard, for example, the external apparatus is determined as an information terminal. For example, based on apparatus-type information inserted in a blanking interval of the video signal, the types of the external apparatus are determined. Further, for example, based on content identifying information inserted in a blanking interval of the video signal, the types of the external apparatus are determined.

In an embodiment of the present invention, the priority determining unit may cyclically determine the priority of the plurality of digital input terminals, based on vendor information transmitted from the external apparatus, together with the connection information of the external apparatus in the plurality of digital input terminals and the selection information of the video signal for a user image display.

In this case, for example, in a state that an image by a video signal from the analog input terminal or the internal tuner is displayed, the signal receiving unit is connected to the digital input terminal connected to an external apparatus of a specific vendor, and starts the authentication process with the external apparatus of the specific vendor. As a result, when thereafter the user selects, as the image-display video signal, the video signal from the external apparatus of a specific vendor, the video-output time is expedited.

Further, in an embodiment of the present invention, the priority determining unit may be arranged to cyclically determine the priority of the plurality of digital input terminals, based on information of a predetermined external apparatus selected by a user, together with the connection information of the external apparatus in the plurality of digital input terminals and the selection information of the video signal for a user image display.

In this case, for example, in a state that an image by a video signal from the analog input terminal or the internal tuner is displayed, the signal receiving unit is connected to the digital input terminal connected to a predetermined external apparatus selected by the user, and starts the authentication process with the predetermined external apparatus. As a result, when thereafter the user selects, as an image-display video signal, the video signal from the predetermined external apparatus, the video-output time is expedited.

According to embodiments of the present invention, based on the connection information of the external apparatus, the selection information of the image-display video signal, etc., the priority of the plurality of digital input terminals is cyclically determined, and the signal receiving unit is connected to a digital input terminal having the highest priority, thereby efficiently performing an authentication with the external apparatus, which may expedite the video-output time.

BRIEF DESCRIPTION OF THE DRAWINGS

FIG. 1 is a block diagram showing a configuration example of an AV system as an embodiment of the present invention;

FIG. 2 is a diagram showing a data structure of an AVI InfoFrame packet inserted in a blanking interval of a video signal;

FIG. 3 is a flowchart showing one example of a process of determining whether one is an information terminal in a controller or not;

FIG. 4 is a table showing one example of a format, used in a non-information terminal, which is regulated by EIA/CEA-861;

FIG. 5 is a table showing a data structure of an SPD InfoFrame packet inserted in a blanking interval of a video signal;

FIG. 10 is a table showing a pin array (type A) of an HDMI terminal;

DETAILED DESCRIPTION OF THE EMBODIMENTS

Figures 6, 7:
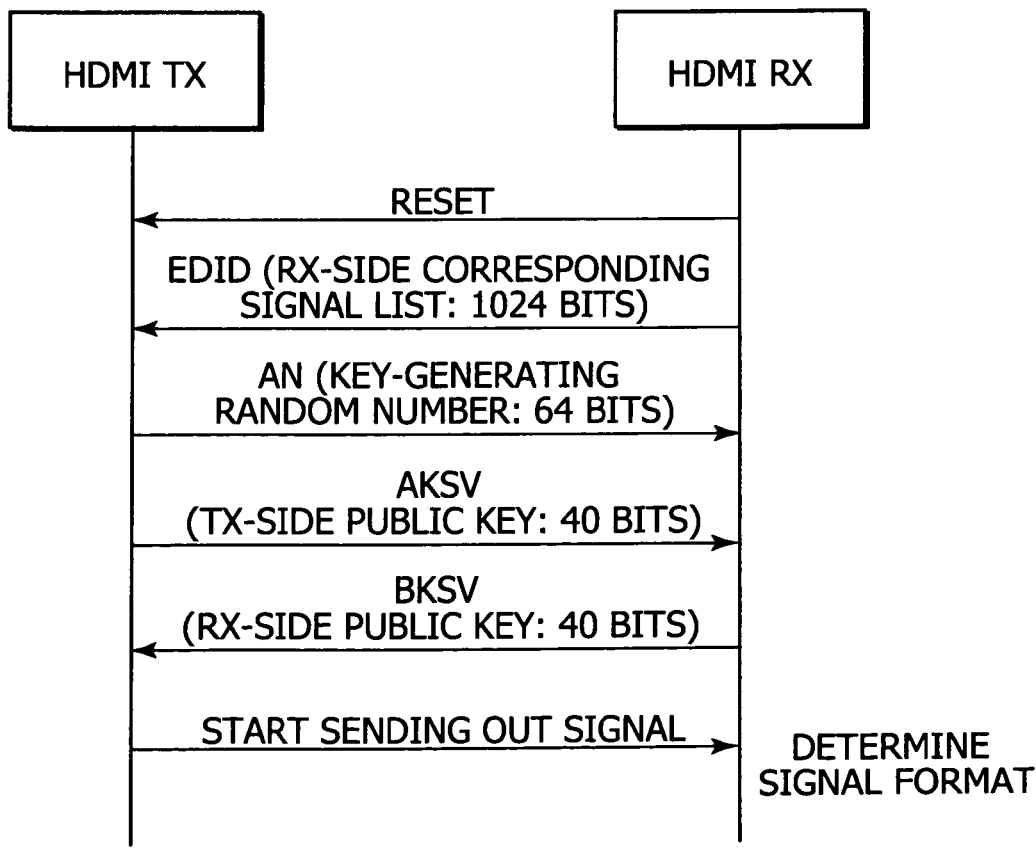
FIG. 6 is a table showing a configuration of Source.Device.Information.
FIG. 7 shows a chart showing steps of an authentication process of HDCP, performed between an HDMI transmitting unit (HDMI Tx) in a source apparatus and an HDMI receiving unit (HDMI Rx) in a sink apparatus.

Hereinafter, with reference to drawings, an embodiment of the present invention will be described. FIG. 1 shows a configuration example of an AV (Audio Visual) system 100 as an embodiment.

The AV system 100 is so configured that as a source apparatus, a DVD (Digital Versatile Disc) recorder 110A, a game machine 110B, and a BD (Blu-ray Disc) recorder 110C are connected to a television receiver 120 as a sink apparatus.

In the television receiver 120, an HDMI terminal 121a, an HDMI terminal 121b, and an HDMI terminal 121c are provided. In the DVD recorder 110A, an HDMI terminal 111a connecting an HDMI transmitting unit (HDMI TX) 112 and a high-speed data line interface (I/F) 113 is provided. Connection between the DVD recorder 110A and the television receiver 120 is realized by connecting one end of the HDMI cable 130a to the HDMI terminal 111a and connecting the other end of the HDMI cable 130a to the HDMI terminal 121a.

Likewise, in the game machine 110B, an HDMI terminal 111b connecting an HDMI transmitting unit (not shown) and a high-speed data line interface (not shown) are provided. In the BD recorder 110C, an HDMI terminal 111c connecting an HDMI transmitting unit (not shown) and a high-speed data line interface (not shown) are provided. Connection between the game machine 110B and the television receiver 120 is realized by connecting one end of the HDMI cable 130b to the HDMI terminal 111b and connecting the other end of the HDMI cable 130b to the HDMI terminal 121b. Further, connection between the game machine 110C and the television receiver 120 is realized by connecting one end of the HDMI cable 130c to the HDMI terminal 111c and connecting the other end of the HDMI cable 130c to the HDMI terminal 121c.

A configuration of the television receiver 120 is described. The television receiver 120 includes HDMI input terminals 121a to 121c, a controller 122, a user operation unit 123, an HDMI switcher (HDMISW) 124, an HDMI receiving unit (HDMI receiver: HDMI Rx) 125, a high-speed data line interface 126, analog-audio input terminals 127-1 to 127-n, analog-video input terminals 128-1 to 128-n, a video/audio switcher (V·A SW) 129, an antenna terminal 130, a tuner 131, a video-signal processing unit 132, a display panel 133, an audio-signal processing unit 134, and a speaker 135.

The controller 122 controls operation of each component of the television receiver 120. The user operation unit 123 constitutes a user interface, and is connected to the controller 122. The user operation unit 123 is configured by a key, a button, a dial placed on a case (not shown) of the television receiver 120, a remote-controlled transmitting/receiving device, etc. The controller 122 has a DRAM 122a. The DRAM 122a is stored therein with connection information of external apparatuses (source apparatuses) to the HDMI terminals 121a to 121c, selection information of an image-display video signal of a user, connection-terminal information of an external apparatus of which the power supply is turned on at last, information of types of external apparatuses connected to the HDMI terminals 121a to 121c, vendor information transmitted from the external apparatuses connected to the HDMI terminals 121a to 121c, information of a predetermined external apparatus (source apparatus) selected by the user, etc.

Herein, the connection information of the external apparatuses to the HDMI terminals 121a to 121c is information indicating to which of the HDMI terminals 121a to 121c the external apparatus is connected in a state that the power supply is turned on. The controller 122 may be able to obtain the connection information by monitoring voltage of 19 pins of the HDMI terminals 121a to 121c because the voltage of the 19 pins (HPD pins) is increased when the external apparatuses are connected to the HDMI terminals 121a to 121c in a state that the power supply is turned on.

The selection information of the image-display video signal of the user is information as to which video signals are selected by the user as a video signal for displaying an image on the display panel 133. The user may be able to select any one of a video signal outputted from the external apparatuses (source apparatuses) connected to the HDMI terminals 121a to 121c, a video signal inputted to the analog-video input terminals 128-1 to 128-n, and a video signal obtained by the tuner 131.

The connection information of the external apparatus of which the power supply is turned on at last is information indicating an HDMI terminal connected with the external apparatus of which the power supply is turned on at last, out of the external apparatuses (source apparatuses) connected to the HDMI terminals 121a to 121c.

Further, the information of types of external apparatuses connected to the HDMI terminals 121a to 121c is information indicating whether the external apparatuses connected to the HDMI terminals 121a to 121c are an information terminals.

The controller 122 determines whether the external apparatus is the information terminal, based on content identifying information inserted in a blanking interval of a video signal sent from the external apparatuses connected to the HDMI terminals 121a to 121c, and a format of the video signal, for example.

FIG. 2 indicates a data structure of an AVI (Auxiliary Video Information) InfoFrame packet inserted in the blanking interval of the video signal. In an HDMI, the AVI InfoFrame packet makes it possible to transmit additional information related to an image from the source apparatus to the sink apparatus.

The content identifying information is hierarchically arranged in 1 bit of CA in a sixth byte (Data Byte3) of the AVI InfoFrame packet and two bits of CT1 and CT0 in an eighth byte (Data Byte5) thereof, as shown in FIG. 2.

CA, which is 1-bit data, identifies whether the content is a moving-image content. Herein, CA=0 indicates a normal moving-image content, and CA=1 indicates not the normal moving-image content. CT1 and CT0, which are 2-bit data, become active when CA=1 is satisfied. That is, when the content is determined by CA as "not a normal moving-image content", CT1 and CT0 are further used.

By the CT1 and the CT0, four contents, i.e., a text content, a photograph content, a cinema content, and a game content, may be identified. That is, when CT1=0 and CT0=0, the text content is indicated. When CT1=0 and CT0=1, the photograph (still image) content is indicated. When CT1=1 and CT0=0, the cinema content is indicated. When CT1=1 and CT0=1, the game content is indicated.

Herein, the text content means a general IT (Information Technology) content. The photograph content means a still-image content. The cinema content means a movie or home video content. The game content means a content of a PC or a game console video.

A flowchart in FIG. 3 indicates a determining process in the controller 122.

The controller 122 starts a process at step ST1, and thereafter, moves to a process of step ST2. At step ST2, the controller 122 determines whether one bit of CA in the sixth byte (Data Byte3) of the AVI InfoFrame packet is one. When CA=1 is not satisfied, the controller 122 determines the format of the video signal at step ST3 to determine whether the format is that used in a non-information terminal. The controller 122 determines the format as the one used in the non-information terminal when the format of the video signal is that specified in EIA/CEA-861 as shown in FIG. 4, for example.

When it is determined that the format is the one used in the non-information terminal, the controller 122 determines at step ST4 that the external apparatus (source apparatus) is the non-information terminal, and thereafter, ends the determining process at step ST5. On the other hand, when it is determined as the format is not the one used in the non-information terminal, the controller 122 determines at step ST6 that the external apparatus (source apparatus) is the information terminal, and thereafter, ends the determining process at step ST5.

When CA=1 is determined at the aforementioned step ST2, the controller 122 moves to a process at step ST7. At step ST7, the controller 122 determines whether the video signal is the text content based on two bits of CT1 and CT0 in the eighth byte (Data Byte5) of the AVI InfoFrame packet. That is, the controller 122 determines whether CT=1 and CT=0 are satisfied.

When determining as the text content, the controller 122 determines at step ST6 that the external apparatus (source apparatus) is the information terminal, and thereafter, ends the determining process at step ST5. On the other hand, when determining as not the text content, the controller 122 determines at step ST4 that the external apparatus (source apparatus) is the non-information terminal, and thereafter, ends the determining process at step ST5.

The controller 122 determines whether the external apparatus is the information terminal based on the apparatus-type information inserted in the blanking interval of the video signal, for example.

FIG. 5 shows a data structure of an SPD (Source Product Description) InfoFrame packet inserted in the blanking interval of the video signal. In the SPD InfoFrame packet, from a DataByte1 to a DataByte8, a VENDOR NAME CHARACTER (vendor name) region is assigned, and by using this region, vendor information is accommodated. From a DataByte9 to a DataByte24, a Product Descript Character (model number) region is assigned. Further, a DataByte25 is a Source. Device. Information (source-apparatus type) region. In the source-apparatus-type region, a code indicating the source-apparatus type is accommodated, as shown in FIG. 6.

The controller 122 is able to determine whether the external apparatus (source apparatus) is the information terminal based on the code indicating the source-apparatus type described in the source-apparatus-type region of the aforementioned SPD InfoFrame packet. For example, when the code indicating the source-apparatus type is "09h", the controller 122 determines that the external apparatus is the information terminal.

The vendor information transmitted from the external apparatuses connected to the HDMI terminals 121a to 121c is the one sent from the external apparatus as described below, for example. For example, the vendor information is included in a CEC vendor command sent through a CEC line from the external apparatus. Further, the vendor information is described in the vendor name region of the aforementioned SPD InfoFrame packet sent in a manner inserted in the blanking interval of the video signal, for example.

Returning to FIG. 1, the HDMI switcher 124 selectively connects the HDMI terminals 121a to 121c to the HDMI receiving unit 125 under the control of the controller 122. A detail of a control process of the HDMI switcher 124 in the controller 122 is described later.

The HDMI receiving unit 125 is selectively connected via the HDMI switcher 124 to any one of the HDMI terminals 121a to 121c. The HDMI receiving unit 125 receives baseband video and audio data transmitted unidirectionally from the external apparatuses (source apparatuses) connected to the HDMI terminals 121a to 121c, by a communication that complies with the HDMI. A detail of the HDMI receiving unit 125 is described later.

In this case, the HDMI receiving unit 125 performs a mutual authentication of an HDCP (High-bandwidth Digital Content Protection system) with the external apparatus, and thereafter, receives the video and audio data from the external apparatus, as described above. FIG. 7 shows steps of an authentication process of the HDCP, performed between the HDMI transmitting unit (HDMI Tx) in the source apparatus and the HDMI receiving unit (HDMI Rx) in the sink apparatus. This authentication of HDCP is performed by an IIC communication using a DDC described later.

At first, a reset signal (Reset) is sent from the HDMI receiving unit to the HDMI transmitting unit, and then, an Rx-side corresponding list (EDID) is sent from the HDMI receiving unit to the HDMI transmitting unit. Subsequently, a key-generating random number An is sent from the HDMI transmitting unit to the HDMI receiving unit, and further, a Tx-side public key AKSV is sent from the HDMI transmitting unit to the HDMI receiving unit. Thereafter, an Rx-side public key BKSV is sent from the HDMI receiving unit to the HDMI transmitting unit, and then, the authentication process of HDCP is performed.

After this authentication process, sending out of encrypted video and audio data from the HDMI transmitting unit to the HDMI receiving unit is started. On a side of the HDMI receiving unit, based on the received video data (video signal), a format thereof can be determined.

The high-speed data line interface 126 is an interface of a bi-directional communication path, configured by predetermined lines (in this embodiment, a reserved line and an HPD line) of the HDMI cable. The high-speed data line interface 126 configures a communicating unit for performing a bi-directional communication with the external apparatus (source apparatus). A detail of the high-speed data line interface 126 is described later.

The video/audio switcher 129 selectively retrieves video and audio signals of one system, from the video and audio signals inputted to the analog-video input terminals 128-1 to 128-n and analog-audio input terminals 127-1 to 127-n, and outputs the retrieved signals.

The tuner 131 receives a BS (Broadcasting Satellite) broadcasting, a terrestrial digital broadcasting, etc., and outputs video and audio data of a program of which station is selected by a user operation. The tuner 131 is supplied with a broadcast signal captured by an antenna (not shown) connected to the antenna terminal 130.

The video-signal processing unit 132 performs a multi-screen process, a superposing process of graphics data, etc., as needed, on a video signal for an image display selected based on a user selection operation, out of the video signal outputted from the HDMI receiving unit 125, the video signal outputted from the video/audio switcher 129, and the video signal outputted from the tuner 131. The video-signal processing unit 132 drives the display panel 133 based on the processed video signal. The display panel 133 is configured by an LCD (Liquid Crystal Display), a PDP (Plasma Display Panel), etc., for example.

The audio-signal processing unit 134 performs a necessary process, such as a D/A conversion and an amplification, on an audio signal for audio output selected based on the user selection operation, out of the audio signal outputted from the HDMI receiving unit 125, the audio signal outputted from the video/audio switcher 129, and the audio signal outputted from the tuner 131, and supplies the processed audio signal to the speaker 135.

An operation of the AV system 100 shown in FIG. 1 is described.

To the HDMI receiving unit 125, the baseband video and audio data is transmitted from the external apparatus (source apparatus) connected to the HDMI terminal selected by the HDMI switcher 124 after the authentication process of HDCP (see FIG. 7). For example, when the HDMI receiving unit 125 is connected to the HDMI terminal 121a, the authentication is mutually performed between the HDMI transmitting unit 111 of the DVD recorder 110A connected by the HDMI cable 130a to the HDMI terminal 121a and the HDMI receiving unit 125, and thereafter, the video and audio data reproduced by the DVD recorder 110A is encrypted, and the encrypted data is sent to the HDMI receiving unit 125.

In the HDMI receiving unit 125, a process for decoding the coding, etc., is performed on the received video and audio data, and then, the video and audio data are outputted. The video data outputted from the HDMI receiving unit 125 is supplied to the video-signal processing unit 132. The audio data outputted from the HDMI receiving unit 125 is supplied to the audio-signal processing unit 134.

The analog video signal inputted to the analog-video input terminals 128-1 to 128-n and the analog audio signal inputted to the analog-audio input terminals 127-1 to 127-n are supplied to the video/audio switcher 129. In the video/audio switcher 129, the video and audio signals of one system are selected, and the selected signals are outputted. The video signal outputted from the video/audio switcher 129 is supplied to the video-signal processing unit 132. The audio signal outputted from the video/audio switcher 129 is supplied to the audio-signal processing unit 134.

The broadcast signal inputted to the antenna terminal 130 is supplied to the tuner 131. In the tuner 131, based on the broadcast signal, the video and audio data of a predetermined program are obtained. The video data outputted from the tuner 131 is supplied to the video-signal processing unit 132. The audio data outputted from the tuner 131 is supplied to the audio-signal processing unit 134.

In the video-signal processing unit 132, out of the video signal outputted from the HDMI receiving unit 125, the video signal outputted from the video/audio switcher 129, and the video signal outputted from the tuner 131, the video signal for an image display is selected based on the user selection operation. In this video-signal processing unit 132, a multi-screen process, a superposing process of graphics data, etc., are performed, as needed, on the selected video signal, and based on the processed video signal, the display panel 133 is driven. Thus, on the display panel 133, the image by the video signal for an image display, selected based on the user selection operation, is displayed.

For example, when the user selects, as the video signal for an image display, the video signal outputted from the DVD recorder 110A connected to the HDMI terminal 121a, the HDMI terminal 121a is selected in the HDMI switcher 124, the video signal outputted from the HDMI receiving unit 125 is selected in the video-signal processing unit 132, and the image (reproduced image) by the video signal outputted from the DVD recorder 110A is displayed on the display panel 133.

For example, when the user selects, as the video signal for an image display, the video signal inputted to a predetermined analog-video input terminal out of the analog-video input terminals 128-1 to 128-n, the predetermined analog-video input terminal is selected in the video/audio switcher 129, the video signal outputted from the video/audio switcher 129 is selected in the video-signal processing unit 132, and the image by the analog video signal inputted to the predetermined analog-video input terminal is displayed on the display panel 133.

For example, when the user selects, as the video signal for an image display, the video signal outputted from the tuner 131, the video signal outputted from the tuner 131 is selected in the video-signal processing unit 132, and the image by the video signal of a predetermined program, outputted from the tuner 131, is displayed on the display panel 133.

Figure 8:
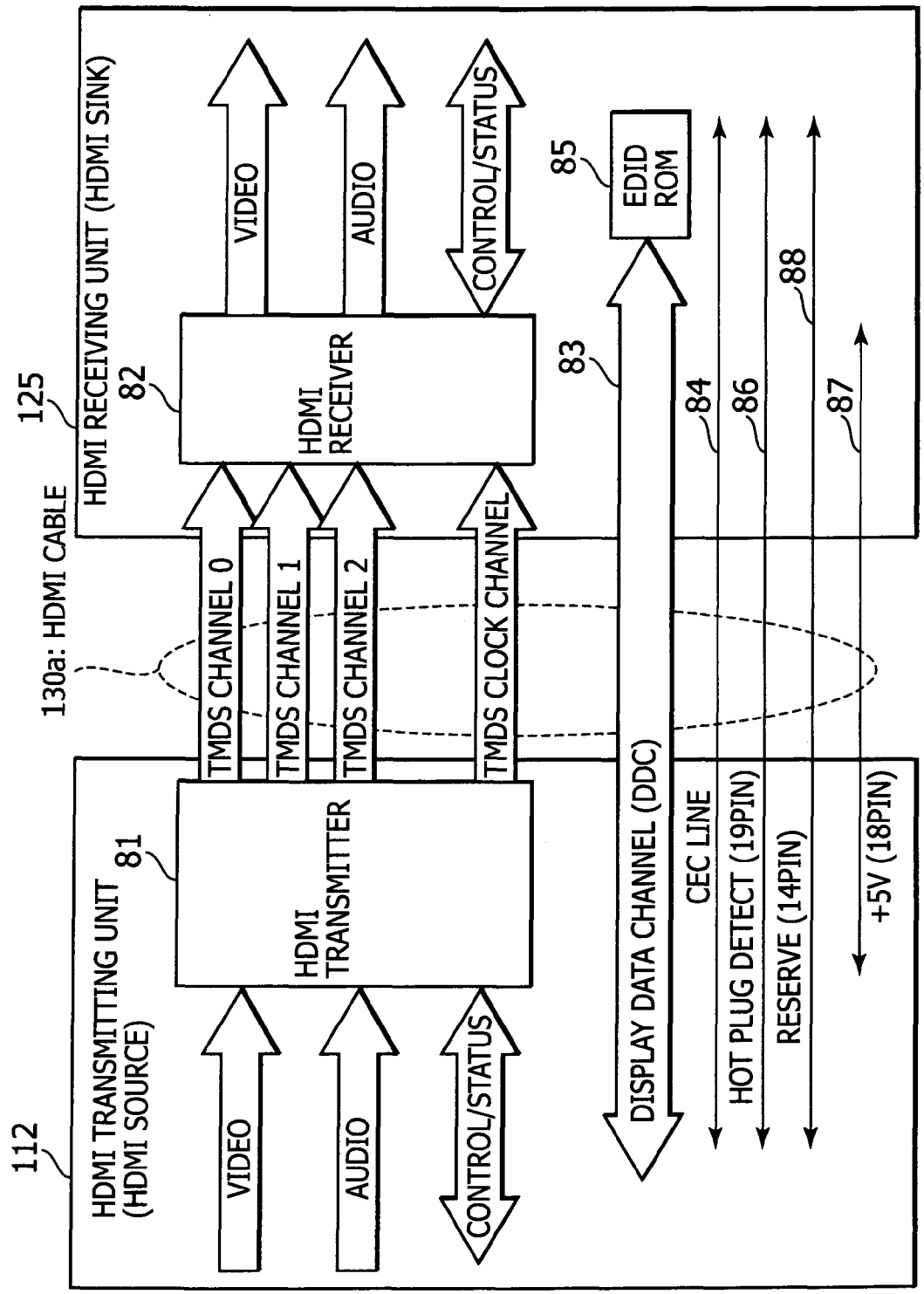
FIG. 8 is a block diagram showing a configuration example of the HDMI transmitting unit (HDMI source) and the HDMI receiving unit (HDMI sink)

FIG. 8 shows a configuration example of the HDMI transmitting unit (HDMI source) 112 of the DVD recorder 110A and the HDMI receiving unit (HDMI sink) 125 of the television receiver 120, in the AV system 100 in FIG. 1. The HDMI transmitting units of the game machine 110B and the BD recorder 110C are configured similarly with the HDMI transmitting unit 112 of the DVD recorder 110A, and thus, the description thereof is omitted.

In an effective image period (hereinafter, appropriately referred also to as an active video period), i.e., a period obtained by removing a horizontal blanking period and a vertical blanking period from a period that is from one vertical synchronizing signal to a subsequent vertical synchronizing signal, the HDMI transmitting unit 112 transmits unidirectionally a differential signal corresponding to the pixel data of a non-compressed one screen image to the HDMI receiving unit 125 by a plurality of channels. Further, either at the horizontal blanking period or the vertical blanking period, differential signals corresponding to the audio data and the control data which at least accompany the image, other auxiliary data, etc., are transmitted unidirectionally to the HDMI receiving unit 125 through a plurality of channels.

That is, the HDMI transmitting unit 112 has a transmitter 81. The transmitter 81 converts the pixel data of the non-compressed image into a corresponding differential signal, and serially transports unidirectionally the converted signal to the HDMI receiving unit 125 connected via the HDMI cable 130*a* through a plurality of channels, i.e., three TMDS channels #0, #1, and #2, for example.

The transmitter 81 further converts the audio data that accompanies the non-compressed image, the necessary control data, other auxiliary data, etc., into a corresponding differential signal, and serially transports unidirectionally the converted signal to the HDMI receiving unit 125 connected via the HDMI cable 130*a* through the three TMDS channels #0, #1, and #2.

The transmitter 81 further transmits a pixel clock synchronized with the pixel data transmitted through the three TMDS channels #0, #1, and #2, to the HDMI receiving unit 125 connected via the HDMI cable 130*a*, through a TMDS clock channel. In this case, through one TMDS channel #i (i=0, 1, 2), during one clock of the pixel clock, 10-bit pixel data is transmitted.

In the active video period, the HDMI receiving unit 125 receives the differential signal corresponding to the pixel data which is transmitted unidirectionally from the HDMI transmitting unit 112 through a plurality of channels. At either the horizontal blanking period or the vertical blanking period, the HDMI receiving unit 125 receives the differential signal corresponding to the audio data or the control data which is transmitted unidirectionally from the HDMI transmitting unit 112 through a plurality of channels.

That is, the HDMI receiving unit 125 has a receiver 82. The receiver 82 receives the differential signal corresponding to the pixel data and the differential signal corresponding to the audio data or the control data, transmitted unidirectionally from the HDMI transmitting unit 112 connected via the HDMI cable 130*a* through the TMDS channels #0, #1, and #2, in synchronization with the pixel clock transmitted through the TMDS clock channel from the same HDMI transmitting unit 112.

As transport channels of the HDMI system formed of the HDMI transmitting unit 112 and the HDMI receiving unit 125, there are cited the three TMDS channels #0 to #2 which are transport channels for serially transporting unidirectionally, from the HDMI transmitting unit 112 to the HDMI receiving unit 125, the pixel data and the audio data in synchronization with the pixel clock, the TMDS clock channel which is a transport channel for transporting the pixel clock, and in addition, a transport channel called a DDC (Display Data Channel) 83 and a CEC line 84.

The DDC 83 is formed of two signal lines (not shown) included in the HDMI cable 130*a*, and used by the HDMI transmitting unit 112 to read out, and so on, E-EDID (Enhanced Extended Display Identification Data) from the HDMI receiving unit 125 connected via the HDMI cable 130*a*.

That is, the HDMI transmitting unit 112 includes, in addition to the HDMI receiver 82, an EDID ROM (Read Only Memory) 85 stored therein with the E-EDID, which is capability information about its own capability (configuration/capability). The HDMI transmitting unit 112 reads out the E-EDID of the HDMI receiving unit 125 via the DDC 83 from the HDMI receiving unit 125 connected via the HDMI cable 130*a*, and based on the E-EDID, recognizes an image format (profile) with which an electronic apparatus having the HDMI receiving unit 125 is compatible, for example. Examples of the image format include RGB, YCbCr4:4:4, and YCbCr4:2:2.

The CEC line 84 is formed of one signal line included in the HDMI cable 130*a*, and is used for performing a bi-directional communication of data for control between the HDMI transmitting unit 112 and the HDMI receiving unit 125.

The HDMI cable 130*a* also includes a line 86 connected to a pin called an HPD (Hot Plug Detect). The source apparatus may utilize the line 86 to detect a connection of the sink apparatus. The HDMI cable 130*a* further includes a line 87 used for supplying a power supply to the sink apparatus from the source apparatus. The HDMI cable 130*a* also includes a reserved line 88.

Figure 9:
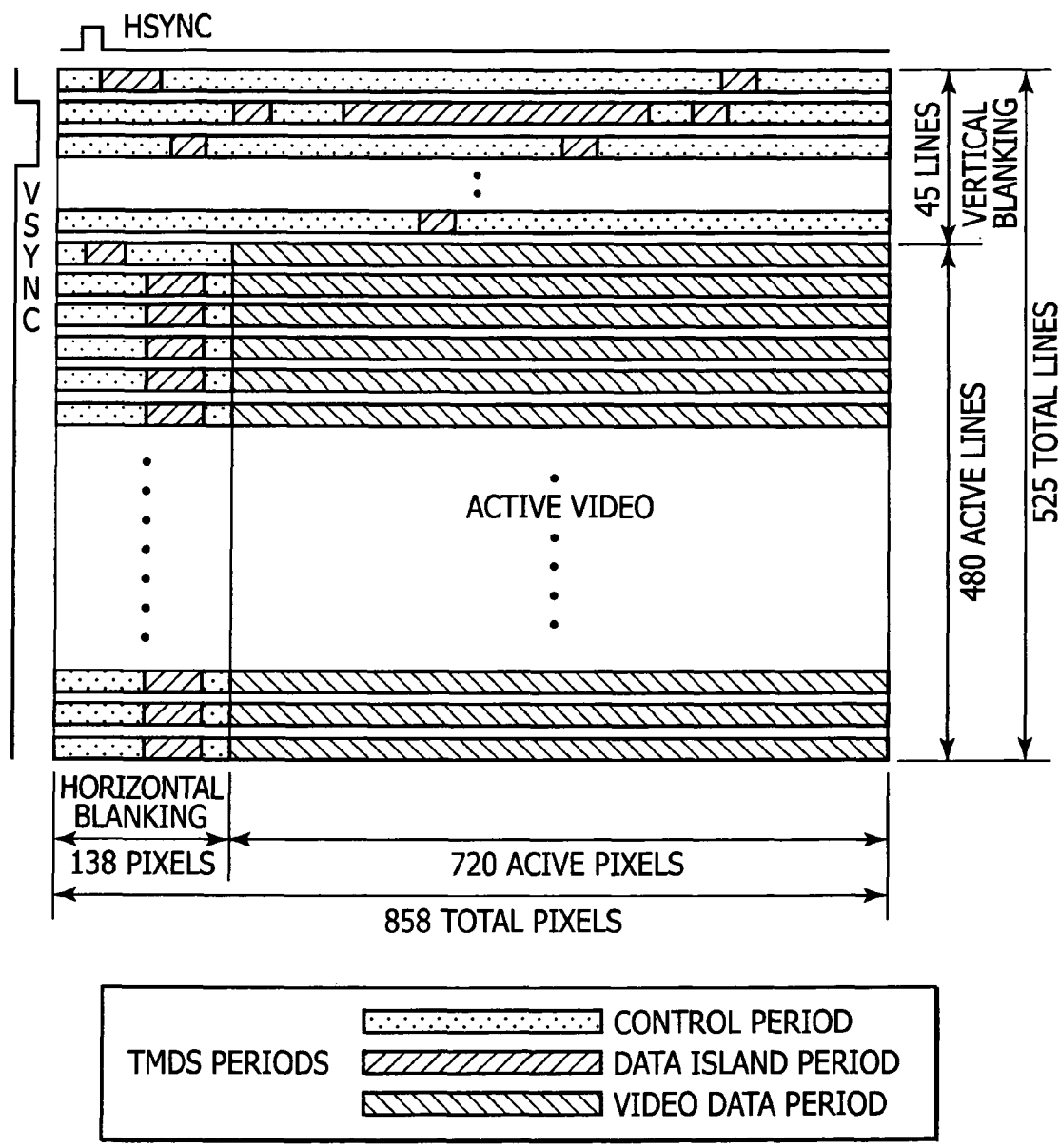
FIG. 9 is a diagram showing a structure of TMDS transmitting data.

FIG. 9 shows an example of a transport period (interval) in which various types of transport data are transported through the three TMDS channels #0, #1, and #2 of the HDMI. FIG. 9 shows periods of the various types of transport data when a progressive image which is composed of 720 pixels horizontally and 480 pixels vertically is transported through the TMDS channels #0, #1, and #2.

In a video field in which the transport data are transported through the three TMDS channels #0, #1, and #2 of the HDMI, there exist three types of periods, i.e., a video data period, a data island period, and a control period, depending on types of the transport data.

In this case, the video field period is a period from a rising edge of a certain vertical synchronizing signal to a rising edge of a subsequent vertical synchronizing signal. The video field period is divided into the horizontal blanking interval, the vertical blanking interval, and the active video period obtained by removing the horizontal blanking interval and the vertical blanking interval from the video field period.

The video data period is allotted to the active video period. In this video data period, data of an effective pixel which is composed of 720 pixels×480 lines which configures non-compressed 1-screen image data is transported.

The data island period and the control period are allotted to the horizontal blanking interval and the vertical blanking interval. In the data island period and the control period, the auxiliary data is transported.

That is, the data island period is allotted to a part of the horizontal blanking interval and the vertical blanking interval. In the data island period, out of the auxiliary data, data not related to control, e.g., a packet of the audio data, etc., are transported.

The control period is allocated to other parts of the horizontal blanking interval and the vertical blanking interval. In this control period, out of the auxiliary data, data related to control, e.g., the vertical synchronizing signal, the horizontal synchronizing signal, the control packet, etc., are transported.

Herein, according to the current HDMI, a frequency of the pixel clock transported through a TMDS clock channel is 165 MHz, for example, and in this case, a transport rate of the data island period is about 500 Mbps. The aforementioned AVI InfoFrame packet and SPD InfoFrame packet are placed in the data island period.

FIG. 10 shows a pin array of the HDMI terminals 29 and 31. This pin array is called a type-A.

Two lines, i.e., differential lines to which TMDS Data#i+ and TMDS Data#i− which are differential signals of the TMDS channel #i are transported, are connected to pins (the pin numbers are 1, 4, and 7) to which the TMDS Data#i+ is allocated and pins (the pin numbers are 3, 6, and 9) to which the TMDS Data#i− is allocated.

The CEC line 84 to which the CEC signal, i.e., the data for control, is transmitted is connected to the pin of which the pin number is 13, and the pin of which the pin number is 14 is a reserved pin. A line to which an SDA (Serial Data) signal such as the E-EDID is transported is connected to the pin of which the pin number is 16, and a line to which an SCL (Serial Clock) signal, i.e., a clock signal used for synchronizing at the time of transmitting and receiving the SDA signal, is transmitted is connected to the pin of which the pin number is 15. The aforementioned DDC 83 is configured by the line through which the SDA signal is transported and the line through which the SCL signal is transported.

As described above, the line 86 used by the source apparatus to detect the connection of the sink apparatus is connected to the pin of which the pin number is 19. As described above, the line 87 for supplying the power supply is connected to the pin of which the pin number is 18.

Figure 11:
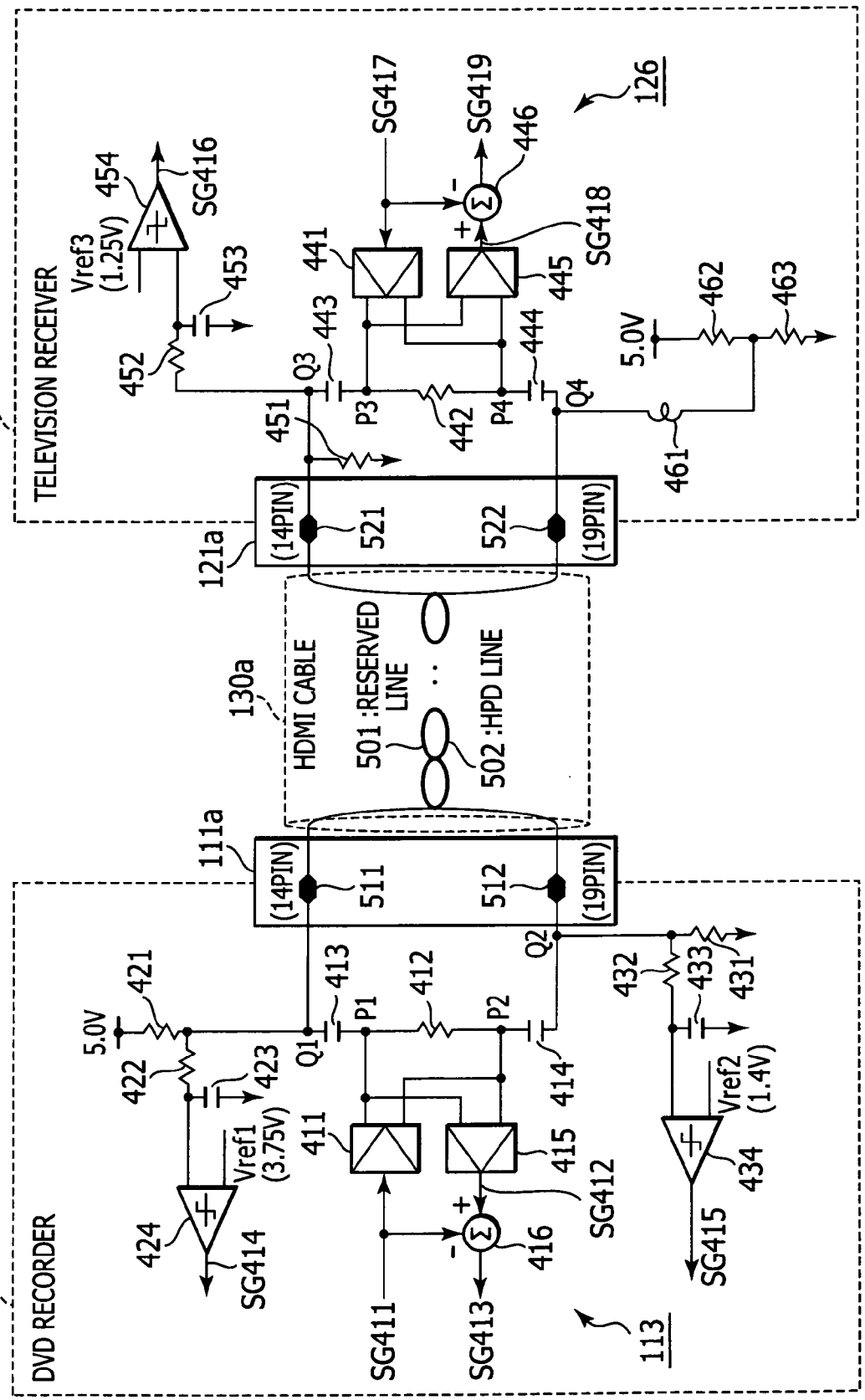
FIG. 11 is a connection diagram showing a configuration example of high-speed data line interfaces of a DVD recorder and a television receiver.

FIG. 11 shows a configuration example of the high-speed data line interface 113 of the DVD recorder 110A and the high-speed data line interface 126 of the television receiver 120, in the AV system 100 in FIG. 1. The high-speed data line interfaces of the game machine 110B and the BD recorder 110C are similarly configured, and thus, the description thereof is omitted.

These high-speed data line interfaces 113 and 126 configure a communicating unit for performing a LAN (Local Area Network) communication. The communicating unit uses a bi-directional communication channel configured by, out of a plurality of lines configuring the HDMI cable 130a, a pair of differential lines, i.e., in this embodiment, the reserved line (Ether− line) corresponding to the reserve pin (14 pin) and the HPD line (Ether+ line) corresponding to the HPD pin (19 pin), in order to perform the communication.

The DVD recorder 110A includes a LAN signal transmitting circuit 411, an end-terminal resistance 412, AC-coupling capacitances 413 and 414, a LAN signal receiving circuit 415, a subtracting circuit 416, a pull-up resistance 421, a resistance 422 and a capacitance 423 configuring a low-pass filter, a comparator 424, a pull-down resistance 431, a resistance 432 and a capacitance 433 forming a low-pass filter, and a comparator 434. Herein, the high-speed data line interface 113 is configured by the LAN signal transmitting circuit 411, the end-terminal resistance 412, the AC-coupling capacitances 413 and 414, the LAN signal receiving circuit 415, and the subtracting circuit 416.

Between a power line (+5.0 V) and a ground line, a series circuit formed of the pull-up resistance 421, the AC-coupling capacitance 413, the end-terminal resistance 412, the AC-coupling capacitance 414, and the pull-down resistance 431 is connected. A mutual connection point P1 between the AC☐coupling capacitance 413 and the end-terminal resistance 412 is connected to a positive output side of the LAN signal transmitting circuit 411, and connected to a positive input side of the LAN signal receiving circuit 415. A mutual connection point P2 between the AC-coupling capacitance 414 and the end-terminal resistance 412 is connected to a negative output side of the LAN signal transmitting circuit 411, and is connected to a negative input side of the LAN signal receiving circuit 415. An input side of the LAN signal transmitting circuit 411 is supplied with a transmission signal (transmission data) SG411.

A positive-side terminal of the subtracting circuit 416 is supplied with an output signal SG412 of the LAN signal receiving circuit 415, and a negative-side terminal of the subtracting circuit 416 is supplied with the transmission signal (transmission data) SG411. In the subtracting circuit 416, the transmission signal SG411 is subtracted from the output signal SG412 of the LAN signal receiving circuit 415, and whereby, a reception signal (reception data) SG413 is obtained.

A connection point Q1 between the pull-up resistance 421 and the AC-coupling capacitance 413 is connected to a ground line via the series circuit of the resistance 422 and the capacitance 423. An output signal of the low-pass filter, obtained at the mutual connection point between the resistance 422 and the capacitance 423, is supplied to one input terminal of the comparator 424. In the comparator 424, the output signal of the low-pass filter is compared with a reference voltage Vref1 (+3.75 V) supplied to the other input terminal. An output signal SG414 of the comparator 424 is supplied to the controller (not shown).

A mutual connection point Q2 between the AC-coupling capacitance 414 and the pull-down resistance 431 is connected to a ground line via the series circuit of the resistance 432 and the capacitance 433. An output signal of the low-pass filter, obtained at the mutual connection point between the resistance 432 and the capacitance 433, is supplied to one input terminal of the comparator 434. In the comparator 434, the output signal of the low-pass filter is compared with a reference voltage Vref2 (+1.4 V) supplied to the other input terminal. An output signal SG415 of the comparator 434 is supplied to the controller (not shown).

The television receiver 120 includes a LAN signal transmitting circuit 441, an end-terminal resistance 442, AC-coupling capacitances 443 and 444, a LAN signal receiving circuit 445, a subtracting circuit 446, a pull-down resistance 451, a resistance 452 and a capacitance 453 configuring a low-pass filter, a comparator 454, a choke coil 461, a resistance 462, and a resistance 463. Herein, the high-speed data line interface 126 is configured by the LAN signal transmitting circuit 441, the end-terminal resistance 442, the AC-coupling capacitances 443 and 444, the LAN signal receiving circuit 445, and the subtracting circuit 446.

Between a power line (+5.0 V) and a ground line, a series circuit of the resistance 462 and the resistance 463 is connected. Between a mutual connection point of the resistance 462 and the resistance 463, and the ground line, a series circuit formed of the choke coil 461, the AC-coupling capacitance 444, the end-terminal resistance 442, the AC-coupling capacitance 443, and the pull-down resistance 451 is connected.

A mutual connection point P3 between the AC-coupling capacitance 443 and the end-terminal resistance 442 is connected to a positive output side of the LAN signal transmitting circuit 441, and is connected to a positive input side of the LAN signal receiving circuit 445. A mutual connection point P4 between the AC-coupling capacitance 444 and the end-terminal resistance 442 is connected to a negative output side of the LAN signal transmitting circuit 441, and is connected to a negative input side of the LAN signal receiving circuit 445. An input side of the LAN signal transmitting circuit 441 is supplied with a transmission signal (transmission data) SG417.

A positive-side terminal of the subtracting circuit 446 is supplied with an output signal SG418 of the LAN signal receiving circuit 445, and a negative-side terminal of the subtracting circuit 446 is supplied with the transmission signal SG417. In the subtracting circuit 446, the transmission signal SG417 is subtracted from the output signal SG418 of the LAN signal receiving circuit 445, and thereby, a reception signal (reception data) SG419 is obtained.

A mutual connection point Q3 between the pull-down resistance 451 and the AC-coupling capacitance 443 is connected to a ground line via the series circuit of the resistance 452 and the capacitance 453. An output signal of the low-pass filter, obtained at the mutual connection point between the resistance 452 and the capacitance 453, is supplied to one input terminal of the comparator 454. In the comparator 454, the output signal of the low-pass filter is compared with a reference voltage Vref3 (+1.25 V) to be supplied to the other input terminal. An output signal SG416 of the comparator 454 is supplied to the controller 122.

A reserved line 501 and an HPD line 502 included in the HDMI cable 130a configure a differential twisted pair. A source-side end 511 of the reserved line 501 is connected to the 14 pin of the HDMI terminal 111a, and a sink-side end 521 of the reserved line 501 is connected to the 14 pin of the HDMI terminal 121a. Further, a source-side end 512 of the HPD line 502 is connected to the 19 pin of the HDMI terminal 111a, and a sink-side end 522 of the HPD line 502 is connected to the 19 pin of the HDMI terminal 121a.

In the DVD recorder 110A, the mutual connection point Q1 between the pull-up resistance 421 and the AC-coupling capacitance 413 is connected to the 14 pin of the HDMI terminal 111a, and the mutual connection point Q2 between the pull-down resistance 431 and the AC-coupling capacitance 414 is connected to the 19 pin of the HDMI terminal 111a. On the other hand, in the television receiver 120, the mutual connection point Q3 between the pull-down resistance 451 and the AC-coupling capacitance 443 is connected to the 14 pin of the HDMI terminal 121a, and the mutual connection point Q4 between the choke coil 461 and the AC-coupling capacitance 444 is connected to the 19 pin of the HDMI terminal 121a.

Subsequently, an operation of the LAN communication by the high-speed data line interfaces 113 and 126 thus configured is described.

In the DVD recorder 110A, the transmission signal (transmission data) SG411 is supplied to the input side of the LAN signal transmitting circuit 411, and from the LAN signal transmitting circuit 411, differential signals (a positive-output signal and a negative-output signal) corresponding to the transmission signal SG411 are outputted. The differential signals outputted from the LAN signal transmitting circuit 411 are supplied to the connection points P1 and P2, and through a pair of lines (the reserved line 501 and the HPD line 502) of the HDMI cable 130a, the signal is transmitted to the television receiver 120.

In the television receiver 120, the transmission signal (transmission data) SG417 is supplied to the input side of the LAN signal transmitting circuit 441, and from the LAN signal transmitting circuit 441, differential signals (a positive-output signal and a negative-output signal) corresponding to the transmission signal SG417 are outputted. The differential signals outputted from the LAN signal transmitting circuit 441 are supplied to the connection points P3 and P4, and through a pair of lines (the reserved line 501 and the HPD line 502) of the HDMI cable 130a, the signal is transmitted to the DVD recorder 110A.

In the DVD recorder 110A, the input side of the LAN signal receiving circuit 415 is connected to the connection points P1 and P2, and thus, as the output signal SG412 of the LAN signal receiving circuit 415, an added signal in which the transmission signal corresponding to the differential signal (a current signal) outputted from the LAN signal transmitting circuit 411 and the reception signal corresponding to the differential signal thus transmitted from the television receiver 120 are added is obtained. In the subtracting circuit 416, the transmission signal SG411 is subtracted from the output signal SG412 of the LAN signal receiving circuit 415. Thus, the output signal SG413 of the subtracting circuit 416 becomes correspondent to the transmission signal (transmission data) SG417 of the television receiver 120.

In the television receiver 120, the input side of the LAN signal receiving circuit 445 is connected to the connection points P3 and P4, and thus, as the output signal SG418 of the LAN signal receiving circuit 445, an added signal in which the transmission signal corresponding to the differential signal (a current signal) outputted from the LAN signal transmitting circuit 441 and the reception signal corresponding to the differential signal thus transmitted from the DVD recorder 110A are added is obtained. In the subtracting circuit 446, the transmission signal SG417 is subtracted from the output signal SG418 of the LAN signal receiving circuit 445. Thus, the output signal SG419 of the subtracting circuit 446 becomes to correspond to the transmission signal (transmission data) SG411 of the DVD recorder 110A.

Thus, between the high-speed data line interface 113 of the DVD recorder 110A and the high-speed data line interface 126 of the television receiver 120, a bi-directional LAN communication may be performed.

In FIG. 11, the HPD line 502 informs the DVD recorder 110A of a connection of the HDMI cable 130a to the television receiver 120 at a DC bias level, in addition to the aforementioned LAN communication. That is, the resistances 462 and 463 and the choke coil 461 in the television receiver 120 bias the HPD line 502 at about 4V via the 19 pin of the HDMI terminal 121a when the HDMI cable 130a is connected to the television receiver 120. The DVD recorder 110A extracts the DC bias of the HPD line 502 by the low-pass filter formed of the resistance 432 and the capacitance 433, and uses the comparator 434 to compare the extracted DC bias with the reference voltage Vref2 (for example, 1.4V).

Voltage of the 19 pin of the HDMI terminal 111a is lower than the reference voltage Vref2 because of the existence of the pull-down resistance 431 when the HDMI cable 130a is not connected to the television receiver 120. In contrary, when the HDMI cable 130a is connected to the television receiver 120, the voltage is higher than the reference voltage Vref2. Therefore, the output signal SG415 of the comparator 434 is at a high level when the HDMI cable 130a is connected to the television receiver 120, and otherwise, becomes a low level. Accordingly, the controller (not shown) of the DVD recorder 110A may be able to recognize whether the HDMI cable 130a is connected to the television receiver 120 based on the output signal SG415 of the comparator 434.

In FIG. 11, there are provided functions of mutually recognizing, by the DC bias potential of the reserved line 501, whether apparatuses connected to both ends of the HDMI cable 130a are those capable of performing the LAN communication (hereinafter, referred to as an "e-HDMI compatible apparatus") or those not capable of performing the LAN communication (hereinafter, referred to as an "e-HDMI non-compatible apparatus").

As described above, the DVD recorder 110A pulls up (+5V) the reserved line 501 by the resistance 421, and the television receiver 120 pulls down the reserved line 501 by the resistance 451. The resistances 421 and 451 do not exist in the e-HDMI non-compatible apparatus.

The DVD recorder 110A uses the comparator 424 to compare the DC potential, of the reserved line 501, passing through the low-pass filter formed of the resistance 422 and the capacitance 423, with the reference voltage Vref1, as described above. When the television receiver 120 is the e-HDMI compatible apparatus and the pull-down resistance 451 exists, the voltage of the reserved line 501 becomes 2.5V. However, when the television receiver 120 is the e-HDMI non-compatible apparatus and the pull-down resistance 451 does not exist, the voltage of the reserved line 501 becomes 5V because of the existence of the pull-up resistance 421.

Thus, when the reference voltage Vref1 is rendered 3.75V, for example, the output signal SG414 of the comparator 424 is at a low level when the television receiver 120 is the e-HDMI compatible apparatus, and otherwise, at a high level. Accordingly, based on the output signal SG414 of the comparator 424, the controller (not shown) of the DVD recorder 110A is able to recognize whether the television receiver 120 is the e-HDMI compatible apparatus.

Likewise, the television receiver 120 uses the comparator 454 to compare the DC potential, of the reserved line 501, passing through the low-pass filter formed of the resistance 452 and the capacitance 453, with the reference voltage Vref3, as described above. When the DVD recorder 110A is the e-HDMI compatible apparatus and the pull-up resistance 421 exists, the voltage of the reserved line 501 becomes 2.5V. However, when the DVD recorder 110A is the e-HDMI non-compatible apparatus and the pull-up resistance 421 does not exist, the voltage of the reserved line 501 becomes 0V because of the existence of the pull-down resistance 451.

Thus, when the reference voltage Vref3 is rendered 1.25V, for example, the output signal SG416 of the comparator 454 is at a high level when the DVD recorder 110A is the e-HDMI compatible apparatus, and otherwise, at a low level. Accordingly, based on the output signal SG416 of the comparator 454, the controller 122 of the television receiver 120 is able to recognize whether the DVD recorder 110A is the e-HDMI compatible apparatus.

Thus, according to the configuration example shown in FIG. 11, in an interface for performing a data transport of video and audio, an exchange and authentication of connection-apparatus information, a communication of apparatus control data, and a LAN communication, by a single HDMI cable 130a, the LAN communication is performed in a bi-directional communication via a pair of differential transport channels and a connection state of the interface is notified by at least one DC bias potential out of the transport channel. Thus, a spatial separation in which the SCL line and the SDA line are not physically used for the LAN communication may be enabled. As a result, this separation may enable the formation of a circuit for the LAN communication irrelevant to an electrical specification regulated regarding DDC, and thus, a stable and ensured LAN communication may be achieved at low cost.

Further, the pull-up resistance 421 shown in FIG. 11 may be provided not in the DVD recorder 110A but in the HDMI cable 130a. In such a case, each of the terminals of the pull-up resistance 421 is connected to each of the reserved line 501 and the line (signal line) connected to the power supply (power supply potential), out of the lines provided in the HDMI cable 130a.

Further, the pull-down resistance 451 and the resistance 463 shown in FIG. 11 may be provided not in the television receiver 120 but in the HDMI cable 130a. In such a case, each of the terminals of the pull-down resistance 451 is connected to each of the reserved line 501 and the line (ground line) connected to a ground (reference potential), out of the lines arranged within the HDMI cable 130a. Further, each of the terminals of the resistance 463 is connected to each of the HPD line 502 and the line (ground line) connected to a ground (reference potential), out of the lines arranged within the HDMI cable 130a.

Subsequently, a control process of the HDMI switcher 124 in the controller 122 is described. The controller 122 cyclically determines a priority of the HDMI terminals 121a to 121c based on at least connection information of the external apparatus (source apparatus) in the HDMI terminals 121a to 121c and selection information of the video signal for the user image display. The controller 122 controls the HDMI switcher 124 so that the HDMI receiving unit 125 is connected to the HDMI terminal determined as having a highest priority. In this sense, the controller 122 configures a priority determining unit and a controller for controlling a switch unit.

Figure 12:
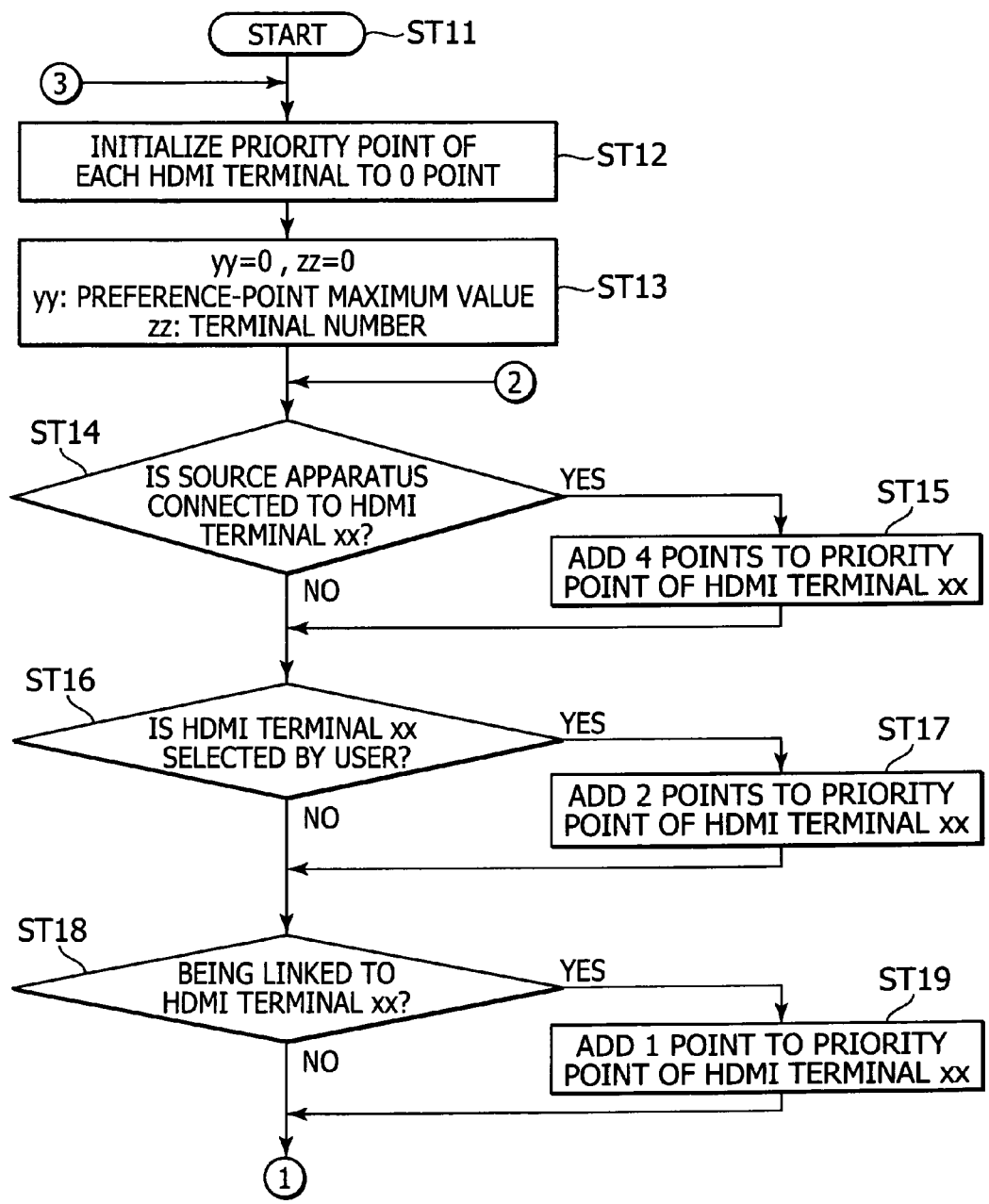
FIG. 12 is a flowchart (1/2) showing one example of a control process of an HDMI switcher, in a controller of a television receiver.
Figure 13:
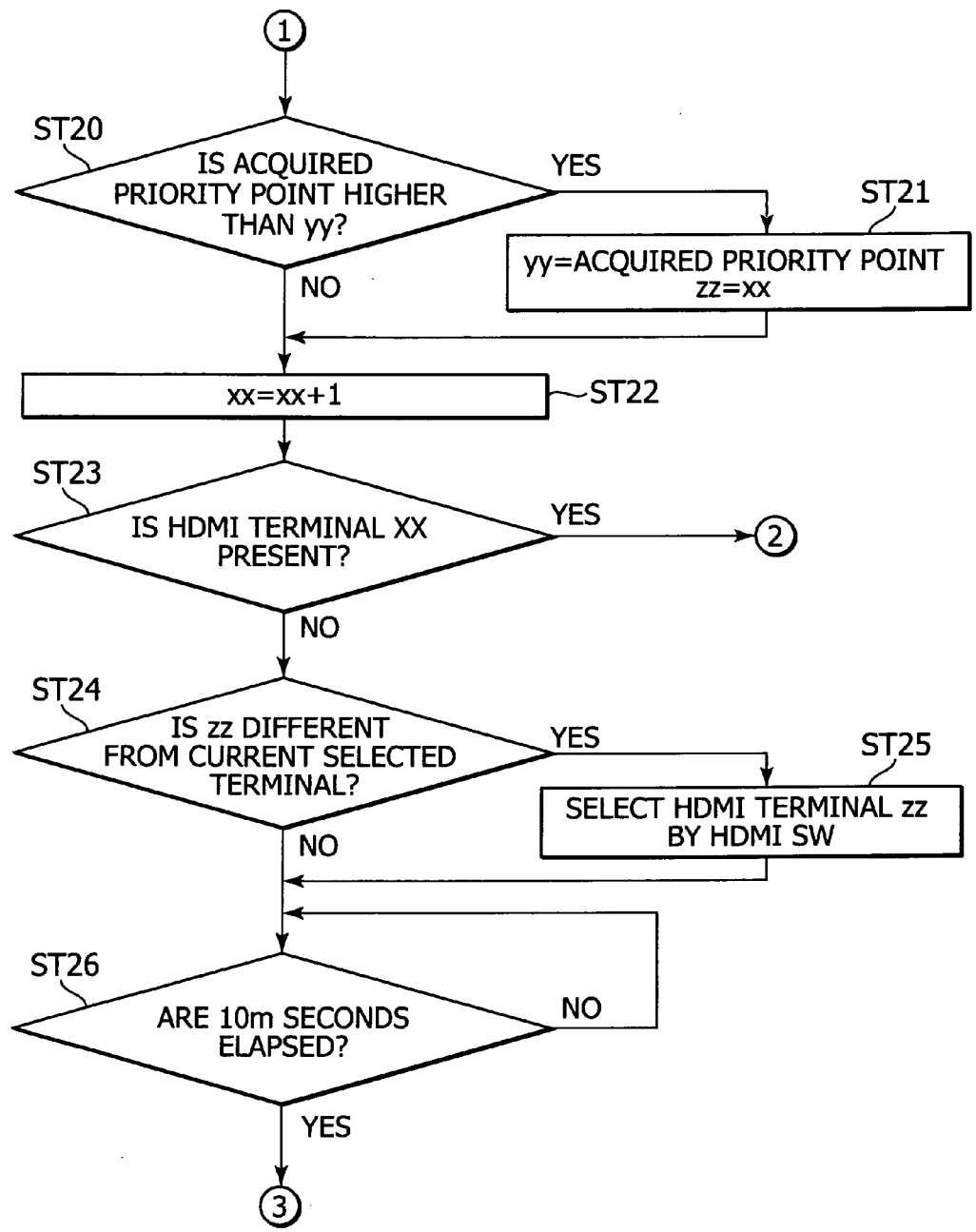
FIG. 13 is a flowchart (2/2) showing one example of the control process of the HDMI switcher, in the controller of the television receiver.

Flowcharts in FIG. 12 and FIG. 13 show one example of the control process of the HDMI switcher 124 in the controller 122.

At first, the controller 122 starts the control process at step ST11, and thereafter, initializes a priority point of each HDMI terminal to 0 point at step ST12. The controller 122 sets a maximum value yy of a priority point to 0 at step ST13, and sets a terminal number zz of an HDMI terminal having the maximum value yy of the priority point to 0.

Subsequently, the controller 122 determines whether the source apparatus (external apparatus) is connected to an HDMI terminal xx at step ST14. When the source apparatus is connected, the controller 122 adds four points to the priority point of the HDMI terminal xx at step ST15, and thereafter, moves to a process at step ST16. On the other hand, when the source apparatus is not connected, the controller 122 immediately moves to the process at step ST16.

At step ST16, the controller 122 determines whether the user selects the HDMI terminal xx, i.e., whether the user selects, as the video signal for an image display, the video signal outputted from the source apparatus (external apparatus) connected to the HDMI terminal xx. When the user selects the HDMI terminal xx, the controller 122 adds two points to the priority point of the HDMI terminal xx at step ST17, and thereafter, the controller 122 moves to a process at step ST18. On the other hand, when the user does not select the HDMI terminal xx, the controller 122 immediately moves to the process at step ST18.

At step ST18, the controller 122 determines whether a link is being established with the HDMI terminal xx, i.e., whether the HDMI receiving unit 125 holds a mutually authenticated state with the source apparatus (external apparatus) connected to the HDMI terminal xx. When the link is being established with the HDMI terminal xx, the controller 122 adds one point to the priority point of the HDMI terminal xx at step ST19, and thereafter, moves to a process at step ST20. On the other hand, when the link is not being established with the HDMI terminal xx, the controller 122 immediately moves to the process at step ST20.

At step ST20, the controller 122 determines whether the acquired priority point is higher than the preference-point maximum value yy. When the acquired priority point is higher than the preference-point maximum value yy, the controller 122 sets the preference-point maximum value yy as the acquired priority point and sets the terminal number zz to xx, and thereafter, the controller 122 moves to a process at step ST22. When the acquired priority point is equal to or less than the preference-point maximum value yy, the controller 122 immediately moves to the process at step ST22.

At step ST22, the controller 122 increments the terminal number xx, and thereafter, moves to a process at step ST23. At step ST23, the controller 122 determines whether the HDMI terminal xx is present. When the HDMI terminal xx is present, the controller 122 returns to the process at step ST14 and moves to a process for obtaining a priority point of a subsequent HDMI terminal. On the other hand, when the HDMI terminal xx is not present, the controller 122 moves to a process at step ST24.

At step ST24, the controller 122 determines whether the terminal number zz is different from a current selected terminal, i.e., whether the HDMI terminal zz is currently selected by the HDMI switcher 124. When the terminal number zz is different from the current selected terminal, the controller 122 selects the HDMI terminal zz by the HDMI switcher 124 at step ST25, and thereafter, moves to a process at step ST26. On the other hand, when the terminal number zz is the same as the current selected terminal, the controller 122 immediately moves to the process at step ST26.

At step ST26, the controller 122 determines whether 10 m seconds are elapsed. After an elapse of 10 m seconds, the controller 122 returns to the step ST12 and moves to a process in a subsequent cycle.

In the AV system 100 shown in FIG. 1, when the controller 122 of the television receiver 120 controls the HDMI switcher 124 as shown in the flowcharts in the aforementioned FIG. 12 and FIG. 13, based on the connection information of the source apparatuses (external apparatuses) in the HDMI terminals 121a to 121c and the selection information of the image-display video signal by the user, the priority point of each HDMI terminal is obtained in a 10 m-second cycle, and the HDMI terminal having the highest priority point is connected to the HDMI receiving unit 125. Therefore, the authentication with the source apparatus (external apparatus) comes to be effectively performed, and as a result, a video-output time is expedited.

For example, it is consider a case where in a state that the image display by the video signal from the DVD recorder 110A connected to the HDMI terminal 121a is performed, a power supply of the DVD recorder 110A is turned off. Noted, it is assumed that a power supply of the game machine 110B connected to the HDMI terminal 121b is turned on and a power supply of the BD recorder 110C is turned off.

In this case, the acquired priority point of the HDMI terminal 121a is three points (two points at step ST17 and one point at step ST19), the acquired priority point of the HDMI terminal 121b is four points (four points at step ST15), and the acquired priority point of the HDMI terminal 121c is 0 point.

Thus, the HDMI terminal 111b connected to the game machine 110B is connected to the HDMI receiving unit 125 by the HDMI switcher 124. Subsequently, the authentication process between the HDMI receiving unit 125 and the game machine 110B is started. Therefore, when the user subsequently selects, as the image-display video signal, the video signal from the game machine 110B connected to the HDMI terminal 111b, the video-output time of the game machine 110B is expedited.

In the AV system 100 shown in FIG. 1, when the controller 122 of the television receiver 120 controls the HDMI switcher 124 as shown in the flowcharts in the aforementioned FIG. 12 and FIG. 13, in addition to each of the aforementioned information, the connection-terminal information of the source apparatus (external apparatus) that is being linked is used to obtain the priority point of each HDMI terminal, and when the user selects, as the image-display signal, the video signal from the source apparatus (external apparatus) that is being linked to the HDMI receiving unit 125, the video-output time is expedited.

For example, it is considered a case where in a state that the image display by the video signal from the DVD recorder 110A connected to the HDMI terminal 121a is performed, the user selects, as the image display signal, the video signal from the tuner 131. At this time, the power supply of the game machine 110B connected to the HDMI terminal 121b is turned on and the power supply of the BD recorder 110C connected to the HDMI terminal 121c is turned off.

In this case, the acquired priority point of the HDMI terminal 121a is five points (four points at step ST15 and one point at step ST19), the acquired priority point of the HDMI terminal 121b is four points (four points at step ST15), and the acquired priority point of the HDMI terminal 121c is 0 point.

Thus, the HDMI terminal 111a connected to the DVD recorder 110A is connected to the HDMI receiving unit 125 by the HDMI switcher 124, and an authentication state is maintained as it is. Therefore, when the user subsequently selects, as the image-display video signal, the video signal from the DVD recorder 110A connected to the HDMI terminal 111a, the video-output time of the DVD recorder 110A is expedited.

Figure 14:
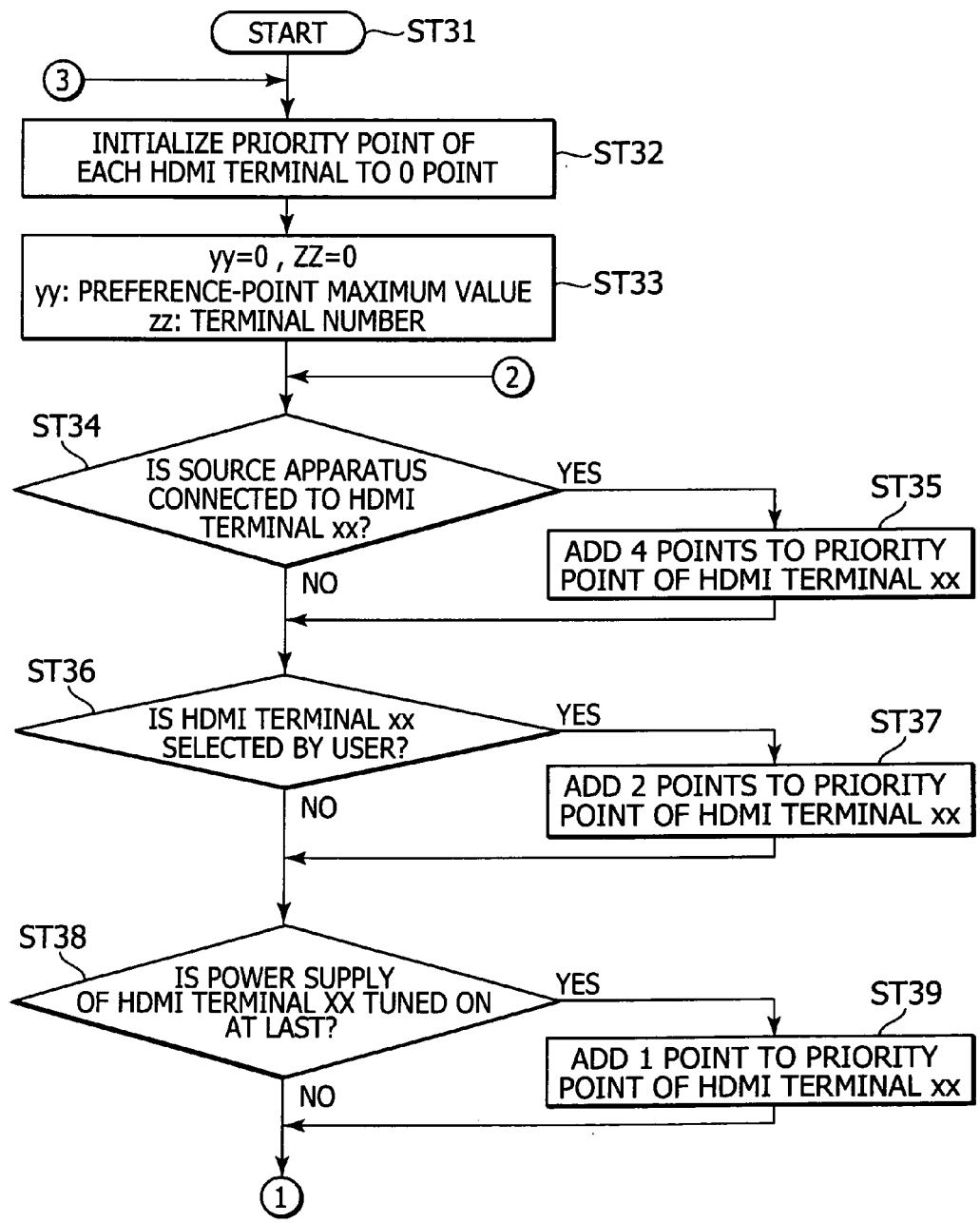
FIG. 14 is a flowchart (1/2) showing another example of the control process of the HDMI switcher, in the controller of the television receiver.
Figure 15:
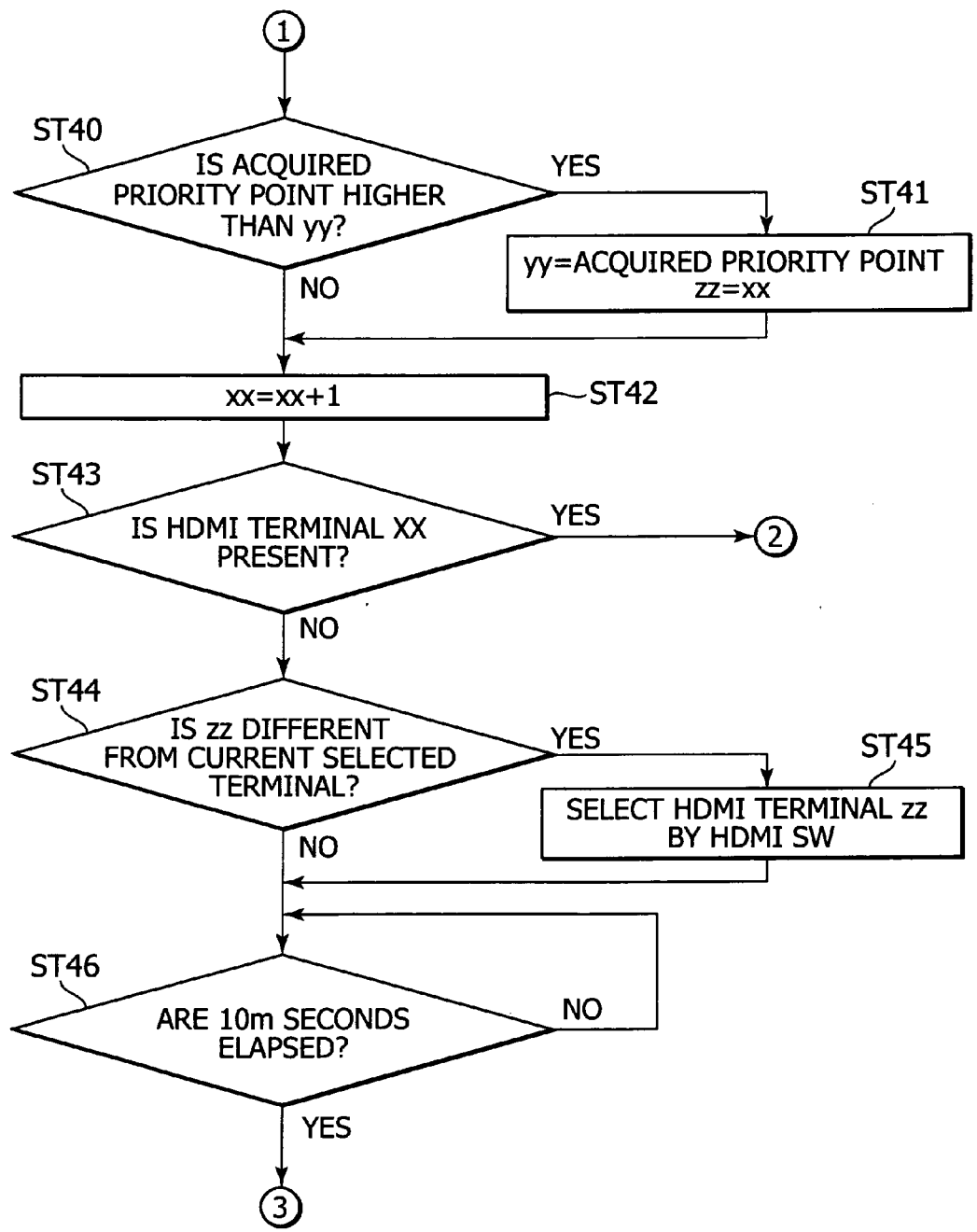
FIG. 15 is a flowchart (2/2) showing another example of the control process of the HDMI switcher, in the controller of the television receiver.

Flowcharts in FIG. 14 and FIG. 15 show another example of the control process of the HDMI switcher 124 in the controller 122.

At first, the controller 122 starts the control process at step ST31, and thereafter, initializes a priority point of each HDMI terminal to 0 point at step ST32. The controller 122 sets a maximum value yy of a preference point to 0 at step ST33, and sets a terminal number zz of the HDMI terminal having the maximum value yy of the preference point to 0.

Subsequently, the controller 122 determines whether the source apparatus (external apparatus) is connected to an HDMI terminal xx at step ST34. When the source apparatus is connected, the controller 122 adds four points to the priority point of the HDMI terminal xx at step ST35, and thereafter, moves to a process at step ST36. On the other hand, when the source apparatus is not connected, the controller 122 immediately moves to the process at step ST36.

At step ST36, the controller 122 determines whether the user selects the HDMI terminal xx, i.e., whether the user selects, as the video signal for an image display, the video signal outputted from the source apparatus (external apparatus) connected to the HDMI terminal xx. When the user selects the HDMI terminal xx, the controller 122 adds two points to the priority point of the HDMI terminal xx at step ST37, and thereafter, the controller 122 moves to a process at step ST38. On the other hand, when the user does not select the HDMI terminal xx, the controller 122 immediately moves to the process at step ST38.

At step ST38, the controller 122 determines whether a power supply of the HDMI terminal xx is turned on at last. When the power supply of the HDMI terminal xx is turned on at last, the controller 122 adds one point to the priority point of the HDMI terminal xx at step ST39, and thereafter, the controller 122 moves to a process at step ST40. On the other hand, when the power supply of the HDMI terminal xx is not turned on at last, the controller 122 immediately moves to the process at step ST40.

At step ST40, the controller 122 determines whether the acquired priority point is higher than the preference-point maximum value yy. When the acquired priority point is higher than the preference-point maximum value yy, the controller 122 sets the preference-point maximum value yy as the acquired priority point at step ST41 and sets the terminal number zz to xx, and thereafter, moves to a process at step ST42. When the acquired priority point is equal to or less than the preference-point maximum value yy, the controller 122 immediately moves to the process at step ST42.

At step ST42, the controller 122 increments the terminal number xx, and thereafter, moves to a process at step ST43. At step ST43, the controller 122 determines whether the HDMI terminal xx is present. When the HDMI terminal xx is present, the controller 122 returns to the process at step ST44 and moves to a process for obtaining a priority point of a subsequent HDMI terminal. On the other hand, when the HDMI terminal xx is not present, the controller 122 moves to a process at step ST44.

At step ST44, the controller 122 determines whether the terminal number zz is different from a current selected terminal, i.e., whether the HDMI terminal zz is currently selected by the HDMI switcher 124. When the terminal number zz is different from the current selected terminal, the controller 122 selects the HDMI terminal zz by the HDMI switcher 124 at step ST45, and thereafter, moves to a process at step ST46. On the other hand, when the terminal number zz is the same as the current selected terminal, the controller 122 immediately moves to the process at step ST46.

At step ST46, the controller 122 determines whether 10 m seconds are elapsed. After an elapse of 10 m seconds, the controller 122 returns to the step ST32 and moves to a process in a subsequent cycle.

In the AV system 100 shown in FIG. 1, when the controller 122 of the television receiver 120 controls the HDMI switcher 124 as shown in the flowcharts in the aforementioned FIG. 14 and FIG. 15, as similar to the controller 122 that controls the HDMI switcher 124, as shown in the flowcharts in the aforementioned FIG. 12 and FIG. 13, based on the connection information of the source apparatuses (external apparatuses) in the HDMI terminals 121a to 121c and the selection information of the image-display video signal by the user, the priority point of each HDMI terminal is obtained in a 10 m-second cycle, and the HDMI terminal having the highest priority point is connected to the HDMI receiving unit 125. Therefore, the authentication with the source apparatus (external apparatus) comes to be effectively performed, and as a result, a video-output time is expedited.

In the AV system 100 shown in FIG. 1, when the controller 122 of the television receiver 120 controls the HDMI switcher 124 as shown in the flowcharts in the aforementioned FIG. 14 and FIG. 15, in addition to each of the aforementioned information, the connection-terminal information of the source apparatus (external apparatus) of which the power supply is turned on at last is used to obtain the priority point. When the user selects, as the image display signal, the video signal from the source apparatus (external apparatus) of which the power supply is turned on at last, the output-video time is expedited.

For example, it is consider a case where in a state that the image display by the video signal from the DVD recorder 110A connected to the HDMI terminal 121a is performed, the user selects, as the image display signal, the video signal from the tuner 131, and thereafter, turns on the power supply of the game machine 110B connected to the HDMI terminal 121b. Noted, it is assumed that the power supply of the BD recorder 110C connected to the HDMI terminal 121c is turned off.

In this case, the acquired priority point of the HDMI terminal 121a is four points (four points at step ST35), the acquired priority point of the HDMI terminal 121b is five points (four points at step ST35 and one point at step ST39), and the acquired priority point of the HDMI terminal 121c is 0 point.

Thus, the HDMI terminal 111b connected to the game machine 110B is connected to the HDMI receiving unit 125 by the HDMI switcher 124. Subsequently, the authentication process between the HDMI receiving unit 125 and the game machine 110B is started. Therefore, when the user subsequently selects, as the image-display video signal, the video signal from the game machine 110B connected to the HDMI terminal 111b, the video-output time of the game machine 110B is expedited.

Figure 16:
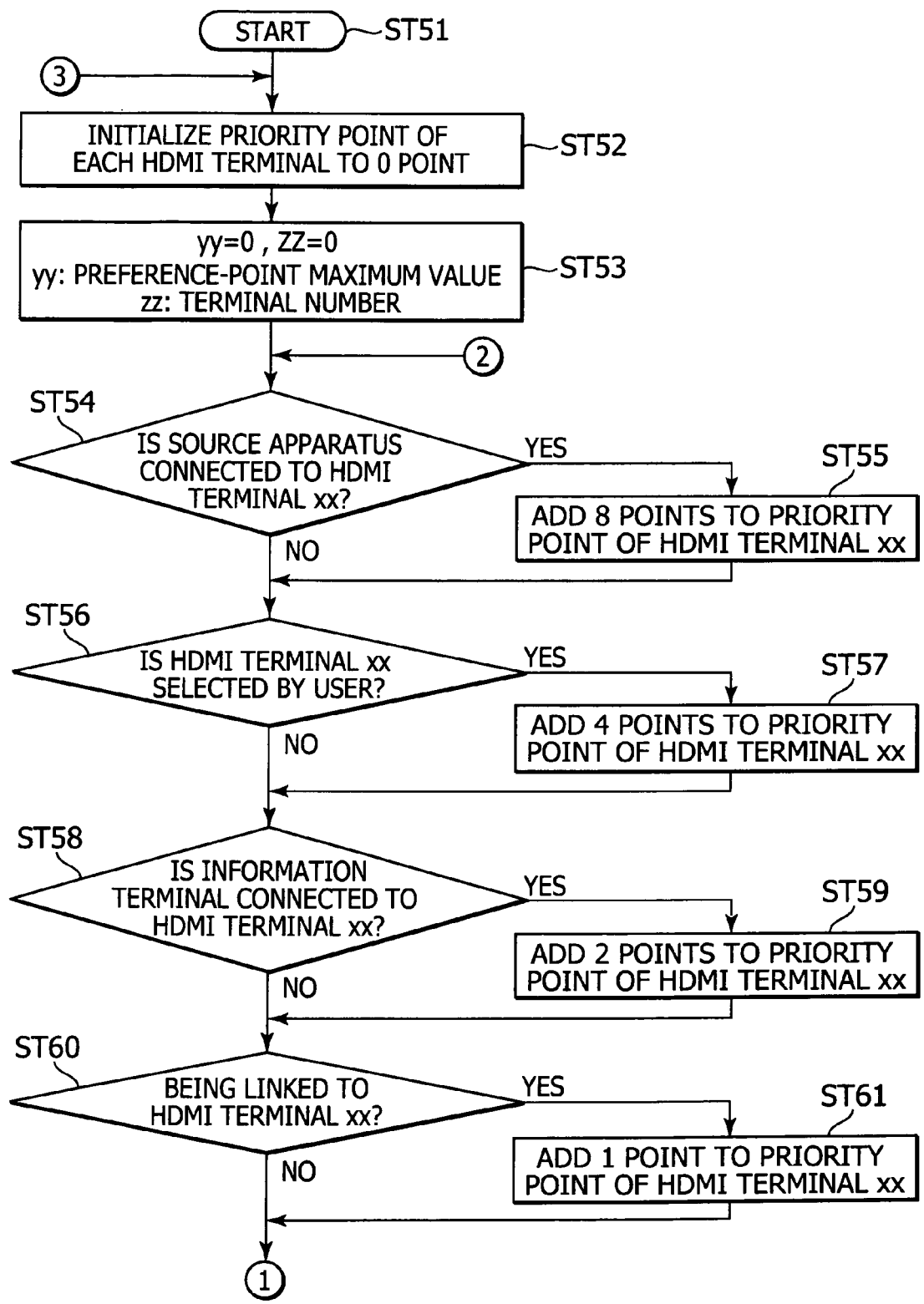
FIG. 16 is a flowchart (1/2) showing another example of the control process of the HDMI switcher, in the controller of the television receiver.
Figure 17:
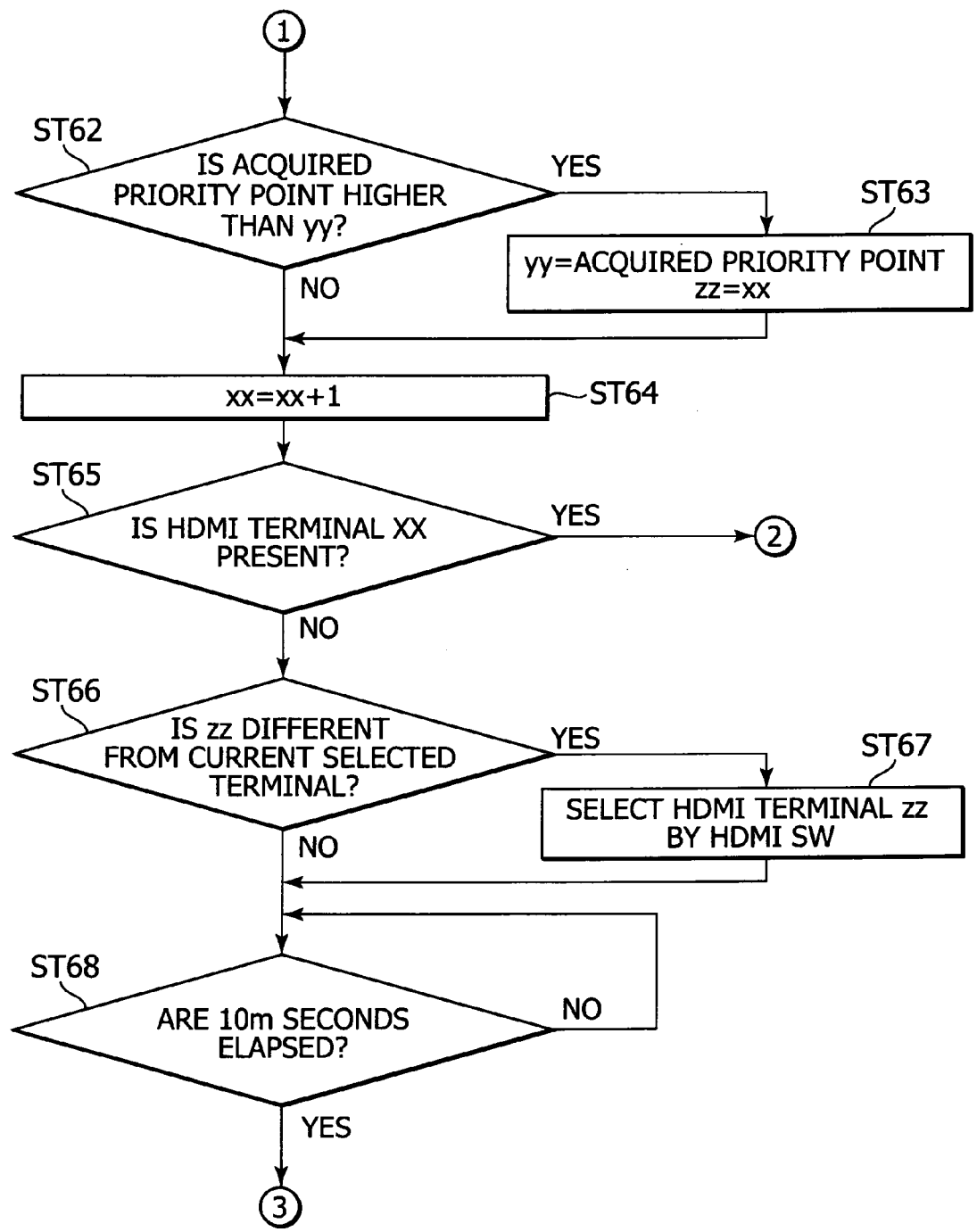
FIG. 17 is a flowchart (2/2) showing another example of the control process of the HDMI switcher, in the controller of the television receiver.

Flowcharts in FIG. 16 and FIG. 17 show another example of the control process of the HDMI switcher 124 in the controller 122.

At first, the controller 122 starts the control process at step ST51, and thereafter, initializes a priority point of each HDMI terminal to 0 point at step ST52. The controller 122 sets a maximum value yy of a preference point to 0 at step ST53, and sets a terminal number zz of the HDMI terminal having the maximum value yy of the preference point to 0.

Subsequently, the controller 122 determines whether the source apparatus (external apparatus) is connected to an HDMI terminal xx at step ST54. When the source apparatus is connected, the controller 122 adds eight points to the priority point of the HDMI terminal xx at step ST55, and thereafter, moves to a process at step ST56. On the other hand, when the source apparatus is not connected, the controller 122 immediately moves to the process at step ST56.

At step ST56, the controller 122 determines whether the user selects the HDMI terminal xx, i.e., whether the user selects, as the video signal for an image display, the video signal outputted from the source apparatus (external apparatus) connected to the HDMI terminal xx. When the user selects the HDMI terminal xx, the controller 122 adds four points to the priority point of the HDMI terminal xx at step ST57, and thereafter, the controller 122 moves to a process at step ST58. On the other hand, when the user does not select the HDMI terminal xx, the controller 122 immediately moves to the process at step ST58.

At step ST58, the controller 122 determines whether the source apparatus (external apparatus) connected to the HDMI terminal xx is the information terminal, such as a personal computer, for example (see FIG. 3). When the information terminal is connected to the HDMI terminal xx, the controller 122 adds two points to the priority point of the HDMI terminal xx at step ST59, and thereafter, the controller 122 moves to a process at step ST60. On the other hand, when the HDMI terminal xx is connected to the non-information terminal, the controller 122 immediately moves to the process at step ST60.

At step ST60, the controller 122 determines whether a link is being established with the HDMI terminal xx, i.e., whether the HDMI receiving unit 125 holds a mutually authenticated state with the source apparatus (external apparatus) connected to the HDMI terminal xx. When the link is being established with the HDMI terminal xx, the controller 122 adds one point to the priority point of the HDMI terminal xx at step ST61, and thereafter, moves to a process at step ST62. On the other hand, when the link is not being established with the HDMI terminal xx, the controller 122 immediately moves to the process at step ST62.

At step ST62, the controller 122 determines whether the acquired priority point is higher than the preference-point maximum value yy. When the acquired priority point is higher than the preference-point maximum value yy, the controller 122 sets the preference-point maximum value yy as the acquired priority point at step ST63 and sets the terminal number zz to xx, and thereafter, moves to a process at step ST64. When the acquired priority point is equal to or less than the preference-point maximum value yy, the controller 122 immediately moves to the process at step ST64.

At step ST64, the controller 122 increments the terminal number xx, and thereafter, moves to a process at step ST65. At step ST65, the controller 122 determines whether the HDMI terminal xx is present. When the HDMI terminal xx is present, the controller 122 returns to the process at step ST54 and moves to a process for obtaining a priority point of a subsequent HDMI terminal. On the other hand, when the HDMI terminal xx is not present, the controller 122 moves to a process at step ST66.

At step ST66, the controller 122 determines whether the terminal number zz is different from a current selected terminal, i.e., whether the HDMI terminal zz is currently selected by the HDMI switcher 124. When the terminal number zz is different from the current selected terminal, the controller 122 selects the HDMI terminal zz by the HDMI switcher 124 at step ST67, and thereafter, moves to a process at step ST68. On the other hand, when the terminal number zz is the same with the current selected terminal, the controller 122 immediately moves to the process at step ST68.

At step ST68, the controller 122 determines whether 10 m seconds are elapsed. After an elapse of 10 m seconds, the controller 122 returns to the step ST52 and moves to a process in a subsequent cycle.

In the AV system 100 shown in FIG. 1, when the controller 122 of the television receiver 120 controls the HDMI switcher 124 as shown in the flowcharts in the aforementioned FIG. 16 and FIG. 17, as similar with the controller 122 that controls the HDMI switcher 124, as shown in the flowcharts in the aforementioned FIG. 12 and FIG. 13, based on the connection information of the source apparatuses (external apparatuses) in the HDMI terminals 121a to 121c, the selection information of the image-display video signal by the user, and the connection-terminal information of the source apparatus (external apparatus) that is being linked to the HDMI receiving unit 125, the priority point of each HDMI terminal is obtained in a 10 m-second cycle, and the HDMI terminal having the highest priority point is connected to the HDMI receiving unit 125. Therefore, the authentication with the source apparatus (external apparatus) comes to be effectively performed, and as a result, a video-output time is expedited.

In the AV system 100 shown in FIG. 1, when the controller 122 of the television receiver 120 controls the HDMI switcher 124 as shown in the flowcharts in the aforementioned FIG. 16 and FIG. 17, in addition to each of the aforementioned information, the type information of the source apparatuses (external apparatuses) connected to the HDMI terminals 121a to 121c is used to obtain the priority point of each HDMI terminal, and when the user selects, as the image display signal, the video signal from the information terminal, the video-output time is expedited, and thus, expediting of the video-output time, expected as the information terminal, may be ensured.

For example, it is considered a case where in a state that the image display by the video signal from the DVD recorder 110A connected to the HDMI terminal 121a is performed, the user selects, as the image display signal, the video signal from the tuner 131. Noted, it is assumed that the power supply of the game machine 110B connected to the HDMI terminal 121b is turned on and functions as the information terminal, and the power supply of the BD recorder 110C connected to the HDMI terminal 121c is turned off.

In this case, the acquired priority point of the HDMI terminal 121a is nine points (eight points at step ST55 and one point at step ST61), the acquired priority point of the HDMI terminal 121b is 10 points (eight points at step ST55 and two points at step ST59), and the acquired priority point of the HDMI terminal 121c is 0 point.

Thus, the HDMI terminal 111b connected to the game machine 110B is connected to the HDMI receiving unit 125 by the HDMI switcher 124. Subsequently, the authentication process between the HDMI receiving unit 125 and the game machine 110B is started. Therefore, when the user subsequently selects, as the image-display video signal, the video signal from the game machine (information terminal) 110B connected to the HDMI terminal 111b, the video-output time of the game machine 110B is expedited.

Figure 18:
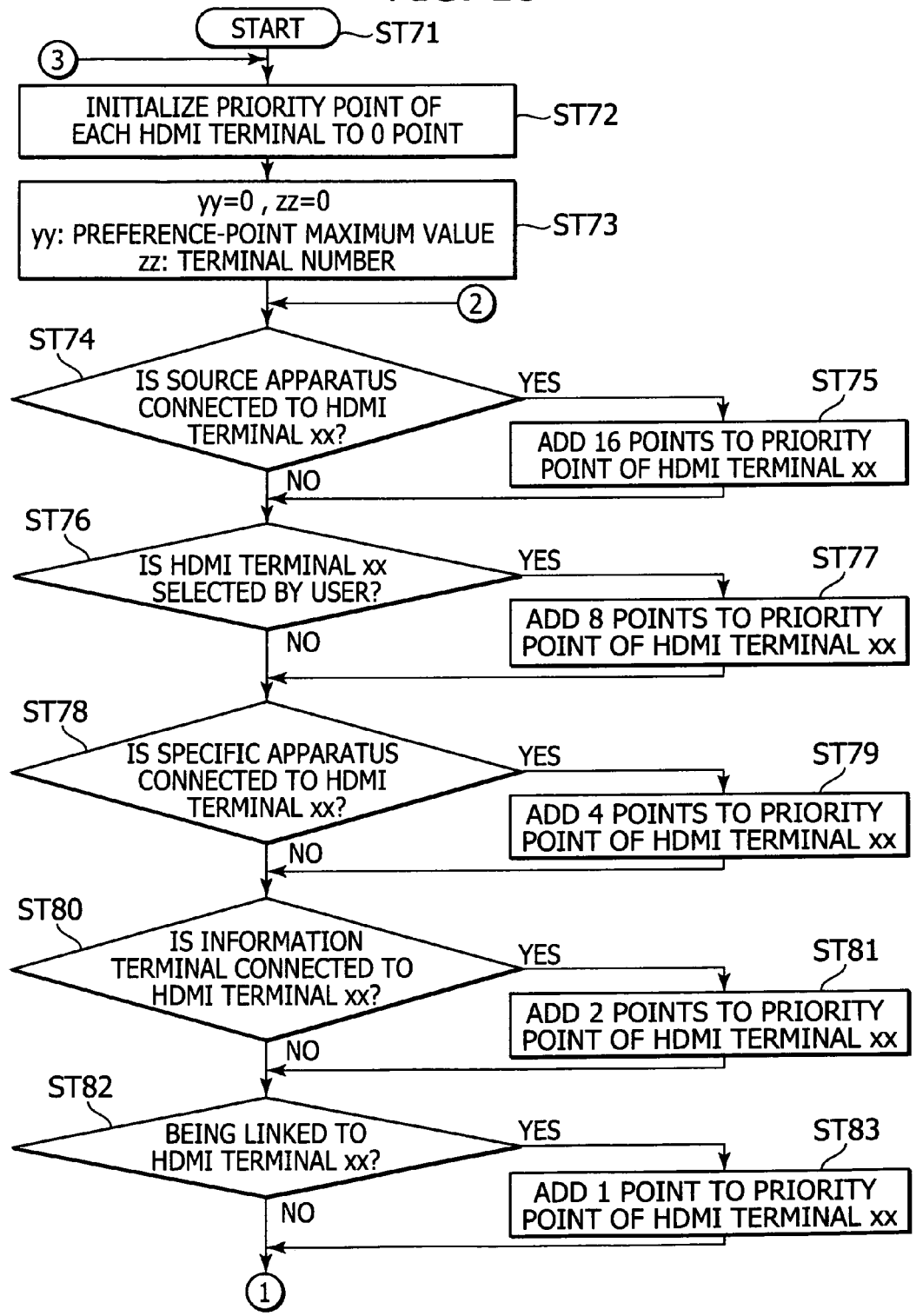
FIG. 18 is a flowchart (1/2) showing another example of the control process of the HDMI switcher, in the controller of the television receiver.
Figure 19:
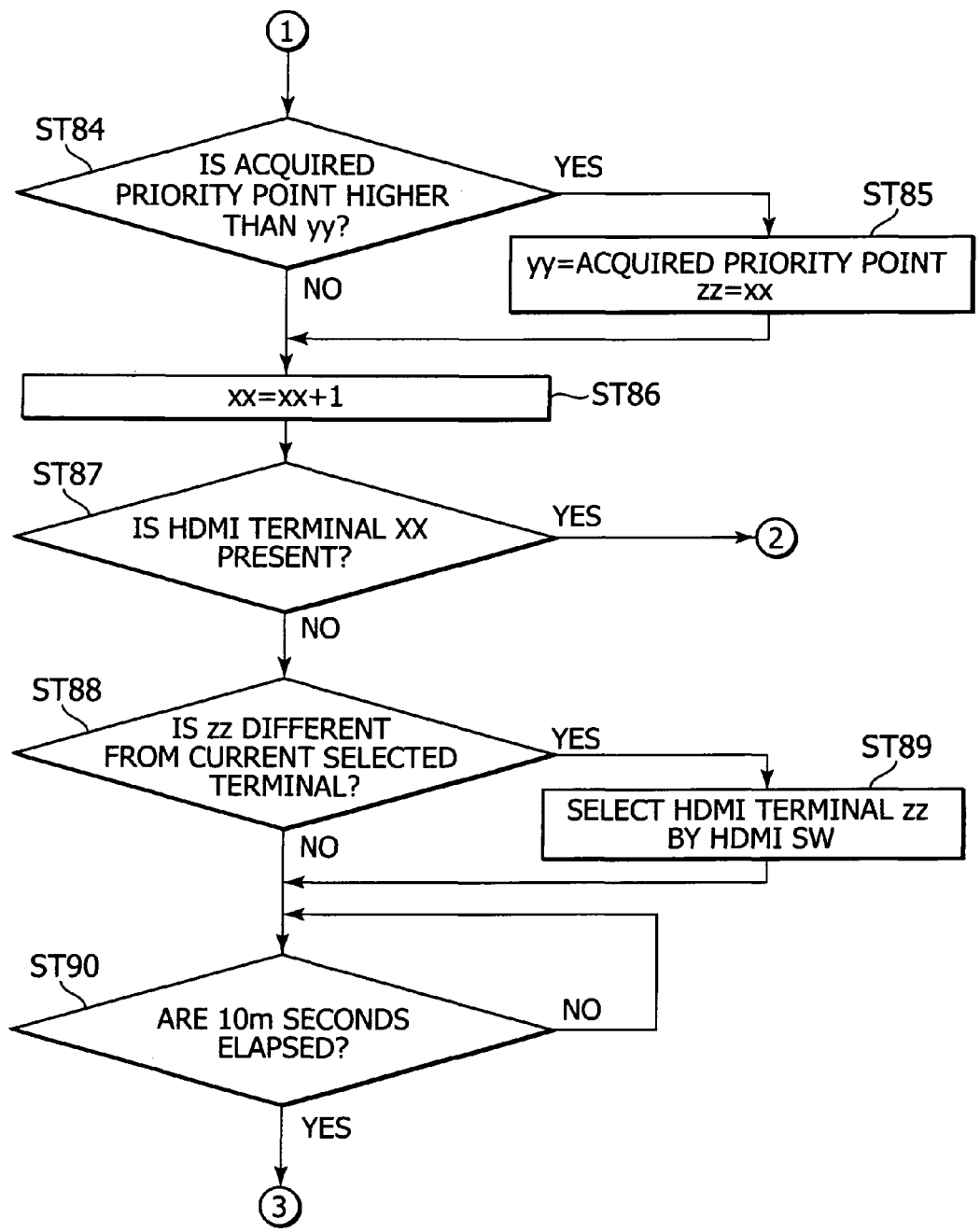
FIG. 19 is a flowchart (2/2) showing another example of the control process of the HDMI switcher, in the controller of the television receiver.

Flowcharts in FIG. 18 and FIG. 19 show another example of the control process of the HDMI switcher 124 in the controller 122.

At first, the controller 122 starts the control process at step ST71, and thereafter, initializes a priority point of each HDMI terminal to 0 point at step ST72. The controller 122 sets a maximum value yy of a preference point to 0 at step ST73, and sets a terminal number zz of the HDMI terminal having the maximum value yy of the preference point to 0.

Subsequently, the controller 122 determines whether the source apparatus (external apparatus) is connected to an HDMI terminal xx at step ST74. When the source apparatus is connected, the controller 122 adds 16 points to the priority point of the HDMI terminal xx at step ST75, and thereafter, moves to a process at step ST76. On the other hand, when the source apparatus is not connected, the controller 122 immediately moves to the process at step ST76.

At step ST76, the controller 122 determines whether the user selects the HDMI terminal xx, i.e., whether the user selects, as the video signal for an image display, the video signal outputted from the source apparatus (external apparatus) connected to the HDMI terminal xx. When the user selects the HDMI terminal xx, the controller 122 adds eight points to the priority point of the HDMI terminal xx at step ST77, and thereafter, the controller 122 moves to a process at step ST78. On the other hand, when the user does not select the HDMI terminal xx, the controller 122 immediately moves to the process at step ST78.

Figure 20:
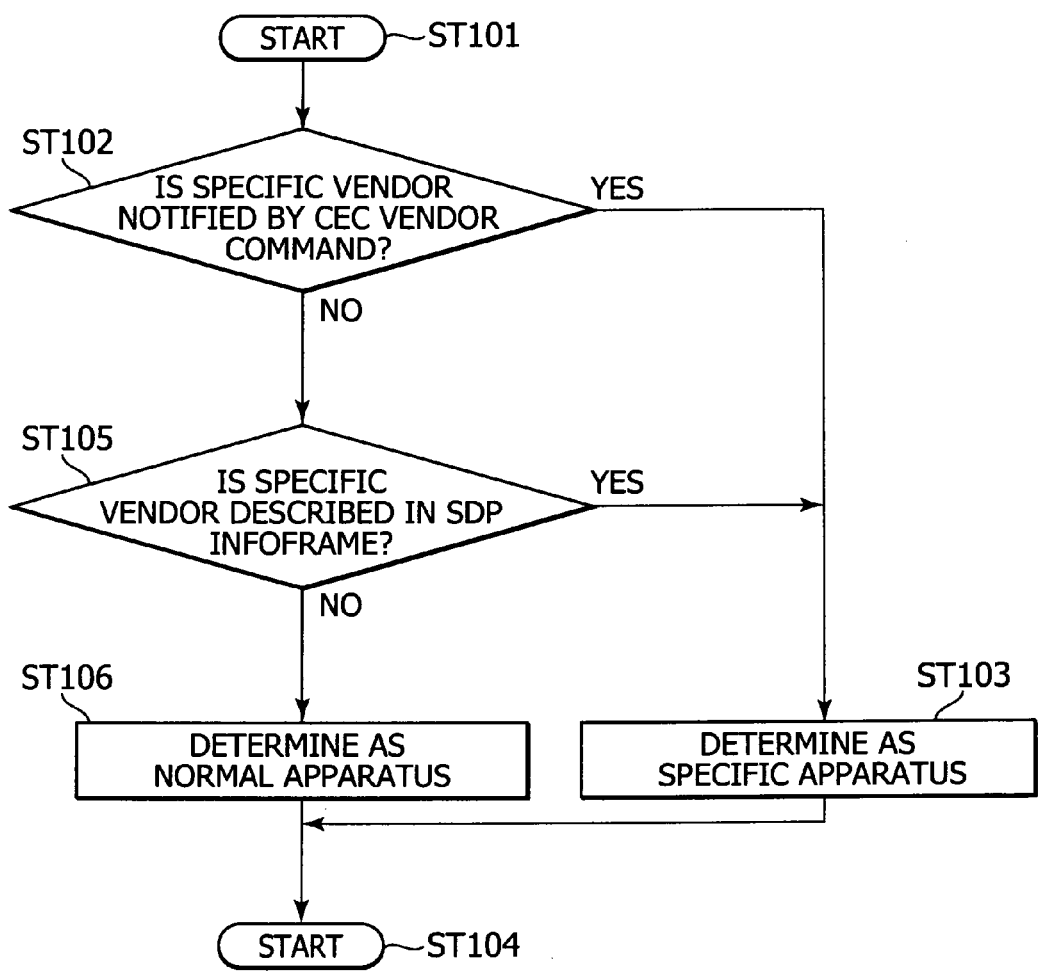
FIG. 20 is a flowchart showing one example of a process for determining whether one is a specific apparatus in the controller.

At step ST78, it is determined whether a specific apparatus is connected to the HDMI terminal xx, i.e., whether the source apparatus (external apparatus) connected to the HDMI terminal xx is an apparatus manufactured by a specific vendor. A flowchart in FIG. 20 shows a process for determining whether the source apparatus is the specific apparatus or a normal-apparatus.

At first, the controller 122 starts the process at step ST101, and thereafter, moves to a process at step ST102. At step ST102, the controller 122 determines whether the specific vendor is notified by a CEC vendor command from the source apparatus (external apparatus) connected to the HDMI terminal xx. When the specific vendor, "ABCD", for example, is notified, the controller 122 determines as the specific apparatus at step ST103, and subsequently, ends the process at step ST104.

When the specific vendor is not notified at step ST102, the controller 122 determines whether the specific vendor, the "ABCD", for example, is described in the vendor name region of the SDP InfoFrame at step ST105. When the specific vendor is described, the controller 122 determines as the specific apparatus at step ST103, and thereafter, ends the process at step ST104. On the other hand, when the specific vendor is not described, the controller 122 determines as the normal apparatus at step ST106, and thereafter, ends the process at step ST104.

When the HDMI terminal xx is connected to the specific apparatus, the controller 122 adds four points to the priority point of the HDMI terminal xx at step ST79, and thereafter, the controller 122 moves to a process at step ST80. On the other hand, when the HDMI terminal xx is not connected to the specific apparatus, the controller 122 immediately moves to the process at step ST80.

At step ST80, the controller 122 determines whether the source apparatus (external apparatus) connected to the HDMI terminal xx is the information terminal such as a personal computer, for example (see FIG. 3). When the HDMI terminal xx is connected to the information terminal, the controller 122 adds two points to the priority point of the HDMI terminal xx at step ST81, and thereafter, the controller 122 moves to a process at step ST82. On the other hand, when the HDMI terminal xx is connected to the non-information terminal, the controller 122 immediately moves to the process at step ST82.

At step ST82, the controller 122 determines whether a link is being established with the HDMI terminal xx, i.e., whether the HDMI receiving unit 125 holds a mutually authenticated state with the source apparatus (external apparatus) connected to the HDMI terminal xx. When the link is being established with the HDMI terminal xx, the controller 122 adds one point to the priority point of the HDMI terminal xx at step ST83, and thereafter, moves to a process at step ST84. On the other hand, when the link is not being established with the HDMI terminal xx, the controller 122 immediately moves to the process at step ST84.

At step ST84, the controller 122 determines whether the acquired priority point is higher than the preference-point maximum value yy. When the acquired priority point is higher than the preference-point maximum value yy, the controller 122 sets the preference-point maximum value yy as the acquired priority point at step ST85 and sets the terminal number zz to xx, and thereafter, moves to a process at step ST86. When the acquired priority point is equal to or less than the preference-point maximum value yy, the controller 122 immediately moves to the process at step ST86.

At step ST86, the controller 122 increments the terminal number xx, and thereafter, moves to a process at step ST87. At step ST87, the controller 122 determines whether the HDMI terminal xx is present. When the HDMI terminal xx is present, the controller 122 returns to the process at step ST74 and moves to a process for obtaining a priority point of a subsequent HDMI terminal. On the other hand, when the HDMI terminal xx is not present, the controller 122 moves to a process at step ST88.

At step ST88, the controller 122 determines whether the terminal number zz is different from a current selected terminal, i.e., whether the HDMI terminal zz is currently selected by the HDMI switcher 124. When the terminal number zz is different from the current selected terminal, the controller 122 selects the HDMI terminal zz by the HDMI switcher 124 at step ST89, and thereafter, moves to a process at step ST90. On the other hand, when the terminal number zz is the same with the current selected terminal, the controller 122 immediately moves to the process at step ST90.

At step ST90, the controller 122 determines whether 10 m seconds are elapsed. After an elapse of 10 m seconds, the controller 122 returns to the step ST72 and moves to a process in a subsequent cycle.

In the AV system 100 shown in FIG. 1, when the controller 122 of the television receiver 120 controls the HDMI switcher 124 as shown in the flowcharts in the aforementioned FIG. 18 and FIG. 19, as similar with the controller 122 that controls the HDMI switcher 124, as shown in the flowcharts in the aforementioned FIG. 16 and FIG. 17, based on the connection information of the source apparatuses (external apparatuses) in the HDMI terminals 121a to 121c, the selection information of the image-display video signal by the user, the connection-terminal information of the source apparatus (external apparatus) that is being linked to the HDMI receiving unit 125, and the type information of the source apparatus (external apparatus), the priority point of each HDMI terminal is obtained in a 10 m-second cycle, and the HDMI terminal having the highest priority point is connected to the HDMI receiving unit 125. Therefore, the authentication with the source apparatus (external apparatus) comes to be effectively performed, and as a result, a video-output time is expedited.

In the AV system 100 shown in FIG. 1, when the controller 122 of the television receiver 120 controls the HDMI switcher 124 as shown in the flowcharts in the aforementioned FIG. 18 and FIG. 19, in addition to each of the aforementioned information, the vendor information of the source apparatuses (external apparatuses) connected to the HDMI terminals 121a to 121c is used to obtain the priority point of each HDMI terminal, and when the user selects, as the image display signal, the video signal from the specific apparatus (apparatus of a specific vendor), the video-output time is expedited.

For example, it is consider a case where in a state that the image display by the video signal from the DVD recorder 110A connected to the HDMI terminal 121a is performed, the user selects, as the image display signal, the video signal from the tuner 131. Noted, it is assumed that the power supply of the game machine 110B connected to the HDMI terminal 121b is turned on, the game machine 110B is the specific apparatus, and the power supply of the BD recorder 110C connected to the HDMI terminal 121c is turned off.

In this case, the acquired priority point of the HDMI terminal 121a is 17 points (16 points at step ST75 and one point at step ST83), the acquired priority point of the HDMI terminal 121b is 20 points (16 points at step ST75 and four points at step ST79), and the acquired priority point of the HDMI terminal 121c is 0 point.

Thus, the HDMI terminal 111b connected to the game machine 110B is connected to the HDMI receiving unit 125 by the HDMI switcher 124. Subsequently, the authentication process between the HDMI receiving unit 125 and the game machine 110B is started. Therefore, when the user subsequently selects, as the image-display video signal, the video signal from the game machine (information terminal) 110B connected to the HDMI terminal 111b, the video-output time of the game machine 110B is expedited.

Figure 21:
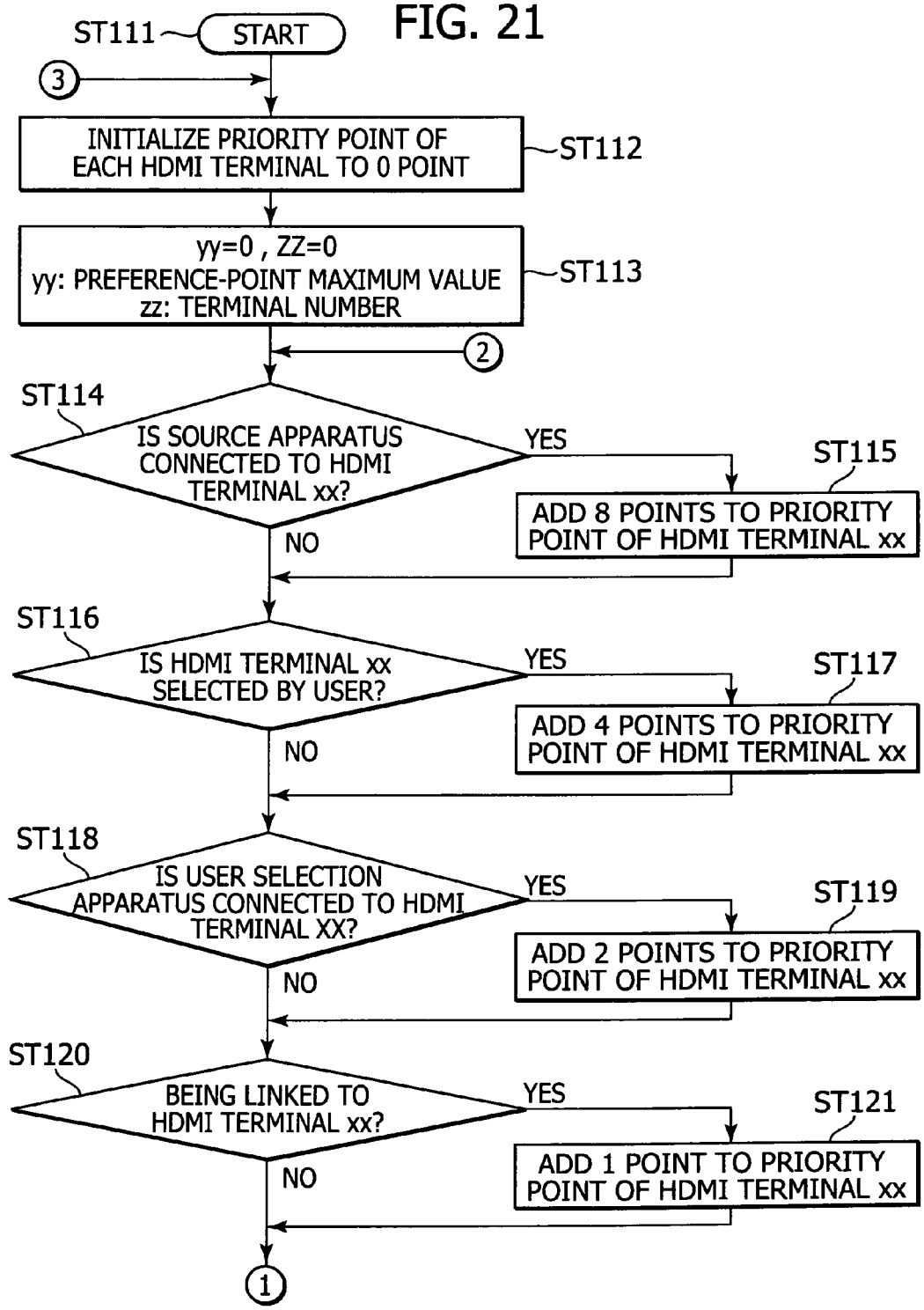
FIG. 21 is a flowchart (1/2) showing another example of the control process of the HDMI switcher, in the controller of the television receiver.
Figure 22:
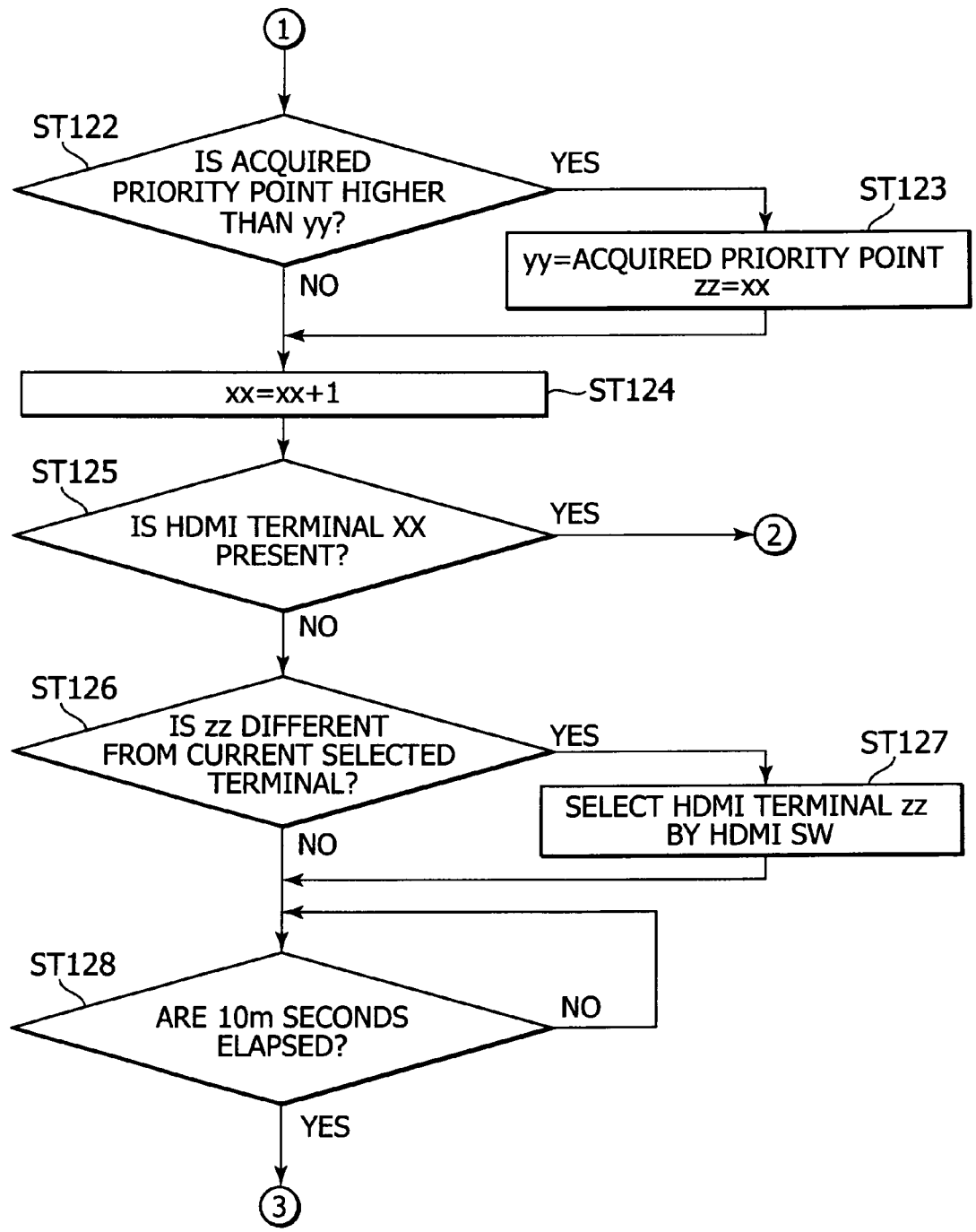
FIG. 22 is a flowchart (2/2) showing another example of the control process of the HDMI switcher, in the controller of the television receiver.

Flowcharts in FIG. 21 and FIG. 22 show another example of the control process of the HDMI switcher 124 in the controller 122.

At first, the controller 122 starts the control process at step ST111, and thereafter, initializes a priority point of each HDMI terminal to 0 point at step ST112. The controller 122 sets a maximum value yy of a preference point to 0 at step ST113, and sets a terminal number zz of the HDMI terminal having the maximum value yy of the preference point to 0.

Subsequently, the controller 122 determines whether the source apparatus (external apparatus) is connected to an HDMI terminal xx at step ST114. When the source apparatus is connected, the controller 122 adds eight points to the priority point of the HDMI terminal xx at step ST115, and thereafter, moves to a process at step ST116. On the other hand, when the source apparatus is not connected, the controller 122 immediately moves to the process at step ST116.

At step ST116, the controller 122 determines whether the user selects the HDMI terminal xx, i.e., whether the user selects, as the video signal for an image display, the video signal outputted from the source apparatus (external apparatus) connected to the HDMI terminal xx. When the user selects the HDMI terminal xx, the controller 122 adds four points to the priority point of the HDMI terminal xx at step ST117, and thereafter, the controller 122 moves to a process at step ST118. On the other hand, when the user does not select the HDMI terminal xx, the controller 122 immediately moves to the process at step ST118.

At step ST118, the controller 122 determines whether the source apparatus (external apparatus) connected to the HDMI terminal xx is a user-selection apparatus, i.e., a predetermined source apparatus (external apparatus) selected by the user in advance. When the HDMI terminal xx is connected to the user-selection apparatus, the controller 122 adds two points to the priority point of the HDMI terminal xx at step ST119, and thereafter, the controller 122 moves to a process at step ST120. On the other hand, when the HDMI terminal xx is connected to the non-information terminal, the controller 122 immediately moves to the process at step ST120.

At step ST120, the controller 122 determines whether a link is being established with the HDMI terminal xx, i.e., whether the HDMI receiving unit 125 holds a mutually authenticated state with the source apparatus (external apparatus) connected to the HDMI terminal xx. When the link is being established with the HDMI terminal xx, the controller 122 adds one point to the priority point of the HDMI terminal xx at step ST121, and thereafter, moves to a process at step ST122. On the other hand, when the link is not being established with the HDMI terminal xx, the controller 122 immediately moves to the process at step ST122.

At step ST122, the controller 122 determines whether the acquired priority point is higher than the preference-point maximum value yy. When the acquired priority point is higher than the preference-point maximum value yy, the controller 122 sets the preference-point maximum value yy as the acquired priority point at step ST123 and sets the terminal number zz to xx, and thereafter, moves to a process at step ST124. When the acquired priority point is equal to or less than the preference-point maximum value yy, the controller 122 immediately moves to the process at step ST124.

At step ST124, the controller 122 increments the terminal number xx, and thereafter, moves to a process at step ST125. At step ST125, the controller 122 determines whether the HDMI terminal xx is present. When the HDMI terminal xx is present, the controller 122 returns to the process at step ST114 and moves to a process for obtaining a priority point of a subsequent HDMI terminal. On the other hand, when the HDMI terminal xx is not present, the controller 122 moves to a process at step ST126.

At step ST126, the controller 122 determines whether the terminal number zz is different from a current selected terminal, i.e., whether the HDMI terminal zz is currently selected by the HDMI switcher 124. When the terminal number zz is different from the current selected terminal, the controller 122 selects the HDMI terminal zz by the HDMI switcher 124 at step ST127, and thereafter, moves to a process at step ST128. On the other hand, when the terminal number zz is the same with the current selected terminal, the controller 122 immediately moves to the process at step ST128.

At step ST128, the controller 122 determines whether 10 m seconds are elapsed. After an elapse of 10 m seconds, the controller 122 returns to the step ST112 and moves to a process in a subsequent cycle.

In the AV system 100 shown in FIG. 1, when the controller 122 of the television receiver 120 controls the HDMI switcher 124 as shown in the flowcharts in the aforementioned FIG. 21 and FIG. 22, as similar with the controller 122 that controls the HDMI switcher 124, as shown in the flowcharts in the aforementioned FIG. 12 and FIG. 13, based on the connection information of the source apparatuses (external apparatuses) in the HDMI terminals 121a to 121c, the selection information of the image-display video signal by the user, and the connection-terminal information of the source apparatus (external apparatus) that is being linked to the HDMI receiving unit 125, the priority point of each HDMI terminal is obtained in a 10 m-second cycle, and the HDMI terminal having the highest priority point is connected to the HDMI receiving unit 125. Therefore, the authentication with the source apparatus (external apparatus) is effectively performed, and as a result, a video-output time is expedited.

In the AV system 100 shown in FIG. 1, when the controller 122 of the television receiver 120 controls the HDMI switcher 124 as shown in the flowcharts in the aforementioned FIG. 21 and FIG. 22, in addition to each of the aforementioned information, information of the predetermined external apparatus selected by the user is used to obtain the priority point of each HDMI terminal. When the user selects, as the image display signal, the video signal from the user-selection apparatus, the video-output time is expedited.

For example, it is consider a case where in a state that the image display by the video signal from the DVD recorder 110A connected to the HDMI terminal 121a is performed, the user selects, as the image display signal, the video signal from the tuner 131. Noted, it is assumed that the power supply of the game machine 110B connected to the HDMI terminal 121b is turned on, the game machine 110B is the user-selection apparatus, and the power supply of the BD recorder 110C connected to the HDMI terminal 121c is turned off.

In this case, the acquired priority point of the HDMI terminal 121a is nine points (eight points at step ST115 and one point at step ST121), the acquired priority point of the HDMI terminal 121b is 10 points (eight points at step ST115 and two points at step ST119), and the acquired priority point of the HDMI terminal 121c is 0 point.

Thus, the HDMI terminal 111b connected to the game machine 110B is connected to the HDMI receiving unit 125 by the HDMI switcher 124. Subsequently, the authentication process between the HDMI receiving unit 125 and the game machine 110B is started. Therefore, when the user subsequently selects, as the image-display video signal, the video signal from the game machine (user-selection apparatus) 110B connected to the HDMI terminal 111b, the video-output time of the game machine 110B is expedited.

In the aforementioned embodiments, whether the external apparatuses (source apparatuses) are connected to the HDMI terminals 121a to 121c are determined by monitoring voltages of the 19 pins (HPD pins) of the HDMI terminals 121a to 121c. However, another method may be used for the determination. For example, a mechanical switch may be attached to a portion of the HDMI terminals 121a to 121c, and the mechanical switch may be used to detect the connection of the HDMI cable so as to make the determination.

The aforementioned embodiments show the television receiver 120 provided with three HDMI terminals 121a to 121c. However, the number of HDMI terminals is not limited thereto. The television receiver 120 may be provided with two, or four or more HDMI terminals.

The embodiment is described by assuming the interface that complies with an HDMI standard as the transmission channel that connects each apparatus. However, the present invention may be applicable to other similar transmission standards. As an example, for the source apparatus, the DVD recorder, the game machine, and the BD recorder are used, and for the sink apparatus, the television receiver is used. The present invention may be similarly applicable to a device using other electronic apparatuses having a similar function.

In the embodiment, the electronic apparatuses are connected each other by the HDMI cable. However, the present invention is similarly applicable to a case that the electronic apparatuses are wirelessly connected with each other.

In the present invention, an authentication with an external apparatus is effectively performed to expedite a video-output time, and the present invention may be applicable to a receiving device, such as a television receiver, used by switching a plurality of HDMI terminals by an HDMI switcher.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving device, comprising:
   a plurality of digital input terminals;
   a signal receiving unit for receiving a video signal; and
   a switch unit for selectively connecting the plurality of digital input terminals to the signal receiving unit, wherein
   the signal receiving unit is a receiving device that performs a mutual authentication with an external apparatus connected via a transmission channel to a digital input terminal selected by the switch unit, and thereafter, receives a video signal from the external apparatus, and
   the signal receiving unit comprises:
   a priority determining unit for cyclically determining a priority of the plurality of digital input terminals, based on a combination of at least connection information of the external apparatus in the plurality of digital input terminals and selection information of a video signal for a user image display, wherein the cyclically determining the priority includes, in each cycle that the priority is determined, for each of the digital input terminals, adding a first point value to a priority point of the digital input terminal when the connection information indicates connection of the external apparatus to the digital input terminal and adding a second point value to the priority point of the digital input terminal when the selection information indicates selection of the digital input terminal, the first point value being different from the second point value; and
   a controller for controlling the switch unit so that a digital input terminal, which is determined by the priority determining unit as having, for a cycle, a highest priority based on a priority point having a highest point value among the priority points, respectively, of the digital input terminals, is connected to the signal receiving unit.

2. The receiving device according to claim 1, wherein the priority determining unit cyclically determines the priority of the plurality of digital input terminals, based on connection-terminal information of an external apparatus mutually authenticated with the signal receiving unit, together with the connection information of the external apparatus in the plurality of digital input terminals and the selection information of the video signal for a user image display.

3. The receiving device according to claim 1, wherein the priority determining unit cyclically determines the priority of the plurality of digital input terminals, based on connection-terminal information of an external apparatus whose power supply is turned on at last, together with the connection information of the external apparatus in the plurality of digital input terminals and the selection information of the video signal for a user image display.

4. The receiving device according to claim 1, wherein the priority determining unit cyclically determines the priority of the plurality of digital input terminals, based on types of the external apparatus connected to the plurality of digital input terminals, together with the connection information of the external apparatus in the plurality of digital input terminals and the selection information of the video signal for a user image display.

5. The receiving device according to claim 4, wherein the priority determining unit determines the types of the external apparatus, based on a format of the video signal transmitted from the external apparatus.

6. The receiving device according to claim 4, wherein the priority determining unit determines the types of the external apparatus, based on apparatus-type information inserted in a blanking interval of the video signal transmitted from the external apparatus.

7. The receiving device according to claim 4, wherein the priority determining unit determines the types of the external apparatus, based on content identification information inserted in a blanking interval of the video signal transmitted from the external apparatus.

8. The receiving device according to claim 1, wherein the priority determining unit cyclically determines the priority of the plurality of digital input terminals, based on vendor information transmitted from the external apparatus, together with the connection information of the external apparatus in the plurality of digital input terminals and the selection information of the video signal for a user image display.

9. The receiving device according to claim 1, wherein the priority determining unit cyclically determines the priority of the plurality of digital input terminals, based on information of a predetermined external apparatus selected by a user, together with the connection information of the external apparatus in the plurality of digital input terminals and the selection information of the video signal for a user image display.

10. The receiving device according to claim 1, wherein the signal receiving unit receives the video signal from the external apparatus by a differential signal through a plurality of channels.

11. The receiving device according to claim 1, further comprising:
    a communicating unit that uses predetermined lines configuring the transmission channel so as to perform a bi-directional communication with an external apparatus connected via the transmission channel to the plurality of digital input terminals.

12. The receiving device according to claim 11, wherein the transmission channel is a High Definition Multimedia Interface (HDMI) cable, and
    the predetermined lines are a reserved line and a Hot Plug Detect (HPD) line configuring the HDMI cable.

13. An input switching control method in a receiving device, the receiving device including:
    a plurality of digital input terminals;
    a signal receiving unit for receiving a video signal;
    a switch unit for selectively connecting the plurality of digital input terminals to the signal receiving unit; wherein
    the signal receiving unit performs a mutual authentication with an external apparatus connected via a transmission channel to a digital input terminal selected by the switch unit, and thereafter, receives a video signal from the external apparatus, the input switching control method in a receiving device comprising:
    a priority determining step of cyclically determining a priority of the plurality of digital input terminals, based on a combination of at least connection information of the external apparatus in the plurality of digital input terminals and selection information of a video signal for a user image display, wherein the cyclically determining the priority includes, in each cycle that the priority is determined, for each of the digital input terminals, adding a first point value to a priority point of the digital input terminal when the connection information indicates connection of the external apparatus to the digital input terminal and adding a second point value to the priority point of the digital input terminal when the selection information indicates selection of the digital input terminal, the first point value being different from the second point value; and a controlling step of controlling the switch unit so that a digital input terminal, which is determined by the priority determining step as having, for a cycle, a highest priority based on a priority point having a highest point value among the priority points, respectively, of the digital input terminals, is connected to the signal receiving unit.

* * * * *